(12) United States Patent
Steinbrecher et al.

(10) Patent No.: US 10,634,851 B2
(45) Date of Patent: Apr. 28, 2020

(54) APPARATUS, SYSTEMS, AND METHODS FOR NONBLOCKING OPTICAL SWITCHING

(71) Applicant: Massachusetts Institute of Technology, Cambridge, MA (US)

(72) Inventors: Gregory R. Steinbrecher, Cambridge, MA (US); Dirk Robert Englund, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 60 days.

(21) Appl. No.: 15/982,035

(22) Filed: May 17, 2018

(65) Prior Publication Data

US 2018/0335574 A1    Nov. 22, 2018

Related U.S. Application Data

(60) Provisional application No. 62/507,390, filed on May 17, 2017.

(51) Int. Cl.
*G02B 6/26* (2006.01)
*G02B 6/35* (2006.01)
(Continued)

(52) U.S. Cl.
CPC ......... *G02B 6/356* (2013.01); *G02B 6/29355* (2013.01); *G02B 6/3546* (2013.01);
(Continued)

(58) Field of Classification Search
CPC .............. H04Q 11/0005; G02B 6/3546; G02B 6/3512; G02B 6/3556; G02B 6/356; G02B 6/26

See application file for complete search history.

(56) References Cited

U.S. PATENT DOCUMENTS 4,567,569 A    1/1986   Caulfield et al.
4,633,428 A    12/1986  Byron
(Continued)

FOREIGN PATENT DOCUMENTS

CN    101630178 A    1/2010
WO    2005029404 A2  3/2005
(Continued)

OTHER PUBLICATIONS

Chan, "Optical flow switching networks," Proceedings of the IEEE, vol. 100, No. 5, pp. 1079-1091, 2012.
(Continued)

*Primary Examiner* — Jennifer Doan
(74) *Attorney, Agent, or Firm* — Smith Baluch LLP

(57) ABSTRACT

A method of nonblocking optical switching includes guiding a first optical beam from a first input to a first output via a first path through an optical switching fabric. The first path traverses a phase shifter disposed between a pair of cascaded Mach-Zehnder interferometers. The method also includes receiving a second optical beam for a second path intersecting with the first path through the optical switching fabric. The method also includes moving the first optical beam from the first path to a third path connecting the first input to the first output without intersecting the second path. The method also includes shifting a phase of the first optical beam, with the phase shifter, while moving the first optical beam from the first path to the third path to prevent the first optical beam from interfering with the second optical beam.

14 Claims, 23 Drawing Sheets

(51) Int. Cl.
*G02B 6/293* (2006.01)
*H04Q 11/00* (2006.01)

(52) U.S. Cl.
CPC . *H04Q 11/0005* (2013.01); *H04Q 2011/0015* (2013.01); *H04Q 2011/0035* (2013.01); *H04Q 2011/0047* (2013.01); *H04Q 2011/0052* (2013.01); *H04Q 2011/0058* (2013.01)

(56) References Cited

U.S. PATENT DOCUMENTS

| | | | |
|---|---|---|---|
| 5,004,309 | A | 4/1991 | Caulfield et al. |
| 5,077,619 | A | 12/1991 | Toms |
| 5,095,459 | A | 3/1992 | Ohta et al. |
| 5,428,711 | A | 6/1995 | Akiyama et al. |
| 5,699,449 | A | 12/1997 | Javidi |
| 6,005,998 | A | 12/1999 | Lee |
| 7,173,272 | B2 | 2/2007 | Ralph |
| 7,660,533 | B1 | 2/2010 | Meyers et al. |
| 7,876,248 | B2 | 1/2011 | Berkley et al. |
| 7,985,965 | B2 | 7/2011 | Barker et al. |
| 8,018,244 | B2 | 9/2011 | Berkley |
| 8,023,828 | B2 | 9/2011 | Beausoleil et al. |
| 8,035,540 | B2 | 10/2011 | Berkley et al. |
| 8,190,553 | B2 | 5/2012 | Routt |
| 8,223,414 | B2 | 7/2012 | Goto et al. |
| 8,386,899 | B2 | 2/2013 | Goto et al. |
| 8,560,282 | B2 | 10/2013 | Macready et al. |
| 8,565,600 | B2 * | 10/2013 | McGreer ............. H04J 14/0282 398/67 |
| 8,604,944 | B2 | 12/2013 | Berkley et al. |
| 8,620,855 | B2 | 12/2013 | Bonderson |
| 8,837,544 | B2 | 9/2014 | Santori et al. |
| 9,250,391 | B2 | 2/2016 | McLaughlin et al. |
| 9,354,039 | B2 | 5/2016 | Mower et al. |
| 9,432,750 | B1 * | 8/2016 | Li ..................... H04Q 11/0005 |
| 9,791,258 | B2 | 10/2017 | Mower et al. |
| 2003/0086138 | A1 | 5/2003 | Pittman et al. |
| 2003/0235363 | A1 | 12/2003 | Pfeiffer |
| 2004/0243657 | A1 | 12/2004 | Goren et al. |
| 2007/0180586 | A1 | 8/2007 | Amin |
| 2008/0031566 | A1 | 2/2008 | Matsubara et al. |
| 2008/0212186 | A1 | 9/2008 | Zoller et al. |
| 2008/0273835 | A1 | 11/2008 | Popovic |
| 2009/0028554 | A1 | 1/2009 | Anderson et al. |
| 2013/0011093 | A1 | 1/2013 | Goh et al. |
| 2014/0241657 | A1 | 8/2014 | Manouvrier |
| 2014/0299743 | A1 | 10/2014 | Miller |
| 2015/0354938 | A1 | 12/2015 | Mower et al. |
| 2015/0382089 | A1 | 12/2015 | Mazed |
| 2016/0103281 | A1 | 4/2016 | Matsumoto |
| 2016/0118106 | A1 | 4/2016 | Yoshimura et al. |
| 2016/0162798 | A1 | 6/2016 | Marandi et al. |
| 2017/0031101 | A1 | 2/2017 | Miller |
| 2017/0285373 | A1 | 10/2017 | Zhang et al. |
| 2017/0351293 | A1 | 12/2017 | Carolan et al. |
| 2018/0274900 | A1 | 9/2018 | Mower et al. |
| 2018/0335574 | A1 | 11/2018 | Steinbrecher et al. |

FOREIGN PATENT DOCUMENTS

| | | | |
|---|---|---|---|
| WO | 2006023067 | A2 | 3/2006 |
| WO | 2008069490 | A1 | 6/2008 |
| WO | 2018098230 | A1 | 5/2018 |

OTHER PUBLICATIONS

Harris et al., "Bosonic transport simulations in a large-scale programmable nanophotonic processor," arXiv preprint arXiv:1507.03406, 2015. 8 pages.
Kilper et al., Optical networks come of age, Opt. Photon. News, vol. 25, pp. 50-57, Sep. 2014.
Lu et al., "16 × 16 non-blocking silicon optical switch based on electro-optic Mach-Zehnder interferometers," Optics Express, vol. 24, No. 9, 13 pages, DOI:10.1364/OE.24.009295 (Apr. 20, 2016).
Ma et al., "Optical switching technology comparison: optical mems vs. Other technologies," IEEE communications magazine, vol. 41, No. 11, pp. S16-S23, 2003.
Mower et al., "High-fidelity quantum state evolution in imperfect photonic integrated circuits," Physical Review A, vol. 92, No. 3, p. 032322, 2015. 7 pages.
Qiao et al., "16×16 non-blocking silicon electro-optic switch based on mach zehnder interferometers," in Optical Fiber Communication Conference, p. Th1C.2, Optical Society of America, 2016. 3 pages.
Reck et al., "Experimental realization of any discrete unitary operator," Physical Review Letters, vol. 73, No. 1, p. 58, 1994. 6 pages.
Zhou, X.-Q., et al., "Calculating Unknown Eigenvalues with a Quantum Algorithm", Nat. Photon 7, (2013), pp. 223-228.
Rohit, A. et al., "8×8 space and wavelength selective cross-connect for simultaneous dynamic multi-wavelength routing", In Optical Fiber Communication Conference, OW1C{4 (Optical Society of America, (2013), 3 pages.
Rosenblatt, The perceptron: a probabilistic model for information storage and organization in the brain. Psychological Review 65, 386 (1958). 23 pages.
Russakovsky et al. ImageNet Large Scale Visual Recognition Challenge. International Journal of Computer Vision (IJCV) 115, 211-252 (2015).
Saade et al., "Random projections through multiple optical scattering: Approximating Kernels at the speed of light," in 2016 IEEE International Conference on Acoustics, Speech and Signal Processing (ICASSP), pp. 6215-6219, IEEE, Mar. 2016.
Salandrino, A. et al., "Analysis of a three-core adiabatic directional coupler", Optics Communications, vol. 282, (2009), pp. 4524-4526.
Schaeff et al., "Scalable fiber integrated source for higher-dimensional path-entangled photonic quNits." Optics Express 20.15 (2012): 16145-16153.
Schirmer et al., "Nonlinear mirror based on two-photon absorption," Journal of the Optical Society of America B, vol. 14, p. 2865, Nov. 1997. 4 pages.
Schmidhuber, J., "Deep learning in neural networks: An overview," Neural Networks 61, pp. 85-117 (2015).
Schreiber, A. et al., "Decoherence and Disorder in Quantum Walks: From Ballistic Spread to Localization", Phys. Rev. Lett., 106, (Jan. 13, 2011), 5 pages.
Schwartz, T. et al., "Transport and Anderson localization in disordered two-dimensional photonic lattices", Nature, vol. 446, (Mar. 1, 2007), p. 52-55.
Selden, "Pulse transmission through a saturable absorber," British Journal of Applied Physics 18, 743 (1967). 7 pages.
Shafiee et al., "ISAAC: A convolutional neural network accelerator with in-situ analog arithmetic in crossbars," ACM/IEEE 43rd Annual International Symposium on Computer Architecture, In Proc. ISCA, 13 pages (2016).
Shen et al., "Deep learning with coherent nanophotonic circuits," Nature Photonics. Jun. 2017. 7 pages.
Shoji, Y. et al., "Low-crosstalk 2×2 thermo-optic switch with silicon wire waveguides," Optics Express 18(9), 9071-9075., published Apr. 15, 2010.
Silver et al. Mastering chess and shogi by self-play with a general reinforcement learning algorithm. arXiv preprint arXiv:1712.01815 (2017). 19 pages.
Silver et al., Mastering the game of go with deep neural networks and tree search, Nature 529, pp. 484-489 (2016).
Silverstone, J. et al., "On-chip quantum interference between silicon photon-pair sources", Nat. Photon., advanced online publication (2013), 5 pages.
Smith et al., "Phase-controlled integrated photonic quantum circuits." Optics Express 17.16 (2009): 13516-13525.
Soljacic et al., "Optimal bistable switching in nonlinear photonic crystals," Physical Review E, vol. 66, p. 055601, Nov. 2002. 4 pages.
Solli et al., "Analog optical computing." Nature Photonics 9.11 (2015): 704. 3 pages.

(56) References Cited

OTHER PUBLICATIONS

Spring, J. B. et al., "Boson sampling on a photonic chip", Science 339, (2013), 24 pages.
Srinivasan et al., 56 Gb/s germanium waveguide electro-absorption modulator. Journal of Lightwave Technology 34, 419-424 (2016).
Steinkraus et al., Using GPUs for machine learning algorithms. In Document Analysis and Recognition, 2005. Proceedings. Eighth International Conference on, 1115-1120 (IEEE, 2005).
Suda et al., "Quantum interference of photons in simple networks." Quantum information processing 12.5 (2013): 1915-1945.
Sun et al., Single-chip microprocessor that communicates directly using light. Nature 528, 534-538 (2015).
Sun, J. et al., "Large-scale nanophotonic phased array", Nature, vol. 493, (Jan. 10, 2013), p. 195-199.
Suzuki, K. et al., "Ultra-compact 8×8 strictly-non-blocking Si-wire PILOSS switch," Optics Express 22(4), 3887-3894 (2014).
Sze et al., Efficient processing of deep neural networks: A tutorial and survey. Proceedings of the IEEE 105, 2295-2329 (2017).
Tabia,"Experimental scheme for qubit and qutrit symmetric informationally complete positive operator-valued measurements using multiport devices." Physical Review A 86.6 (2012): 062107. 8 pages.
Tait et al., "Broadcast and weight: An integrated network for scalable photonic spike processing," Journal of Lightwave Technology, vol. 32, No. 21, pp. 3427-3439, 2014.
Tait et al., "Photonic Neuromorphic Signal Processing and Computing," pp. 183-222, Springer, Berlin, Heidelberg, 2014.
Tait et al., Neuromorphic photonic networks using silicon photonic weight banks. Scientific Reports 7, 7430 (2017). 10 pages.
Tanabe et al., "Fast bistable all-optical switch and memory on a silicon photonic crystal on-chip," Opt. Lett. 30, pp. 2575-2577 (2005).
Tanizawa, K. et al., "Ultra-compact 32×32 strictly-non-blocking Si-wire optical switch with fan-out LGA interposer," Optics Express 23(13), 17599-17606 (2015).
Thompson, M. G. et al., "Integrated waveguide circuits for optical quantum computing", IET Circuits Devices Syst., 2011, vol. 5, Iss. 2, pp. 94-102.
Timurdogan et al., An ultralow power athermal silicon modulator. Nature Communications 5, 4008 (2014). 11 pages.
Vandoorne et al., "Experimental demonstration of reservoir computing on a silicon photonics chip," Nature Communications, vol. 5, p. 3541, Dec. 2014.
Vazquez et al., "Optical NP problem solver on laser-written waveguide plat-form," Optics Express, vol. 26, p. 702, Jan. 2018. 9 pages.
Vivien et al., "Zero-bias 40gbit/s germanium waveguide photodetector on silicon," Opt. Express 20, 1096-1101 (2012).
W. A. Little, "The existence of persistent states in the brain," Mathematical Biosciences, vol. 19, No. 1-2, 1974. 20 pages.
Wang et al., "Coherent Ising machine based on degenerate optical parametric oscillators," Physical Review A, vol. 88, p. 063853, Dec. 2013. 9 pages.
Wang et al., Deep learning for identifying metastatic breast cancer. arXiv preprint arXiv:1606.05718 (2016).6 pages.
Werbos, Beyond regression: New tools for prediction and analysis in the behavioral sciences. Ph.D. dissertation, Harvard University (1974). 454 pages.
Whitfield, J. D. et al., "Simulation of electronic structure Hamiltonians using quantum computers", Molecular Physics 109, 735 (Dec. 19, 2010), 22 pages.
\Nu et al., "An optical fiber network oracle for NP-complete problems," Light: Science & Applications, vol. 3, pp. e147-e147, Feb. 2014.
Xia, F., et al., "Mode conversion losses in silicon-on-insulator photonic wire based racetrack resonators", Optics Express, vol. 14, No. 9, (2006), p. 3872-3886.
Xu et al., "Experimental observations of bistability and instability in a two-dimensional nonlinear optical superlattice," Phys. Rev. Lett. 71, pp. 3959-3962 (1993).
Yang, M. et al., "Non-Blocking 4×4 Electro-Optic Silicon Switch for On-Chip Photonic Networks", Opt. Express, vol. 19, No. 1, (Dec. 20, 2010), p. 47-54.
Yao et al., Serial-parallel multipliers. In Signals, Systems and Computers, 1993. 1993 Conference Record of the Twenty-Seventh Asilomar Conference on, 359-363 (IEEE, 1993).
Young et al., Recent trends in deep learning based natural language processing. IEEE Computational Intelligence Magazine. 13, 55-75 (2018).
George et al., A programmable and configurable mixed-mode FPAA SoC. IEEE Transactions on Very Large Scale Integration (VLSI) Systems 24, 2253-2261 (2016).
Gilmer et al., Neural message passing for quantum chemistry. arXiv preprint arXiv:1704.01212 (2017). 14 pages.
Golub et al., "Calculating the singular values and pseudo-inverse of a matrix," Journal of the Society for Industrial and Applied Mathematics Series B Numerical Analysis, vol. 2, No. 2, pp. 205-224 (1965).
Graves et al., "Hybrid computing using a neural network with dynamic external memory," Nature, vol. 538, 21 pages (2016).
Green, W. et al., "CMOS Integrated Silicon Nanophotonics: Enabling Technology for Exascale Computational System", IBM Corporation, (Invited Talk at SEMICON 2010, Chiba, Japan, Dec. 1, 2010), 30 pages.
Grote et al., First long-term application of squeezed states of light in a gravitational-wave observatory. Physical Review Letters 110, 181101 (2013). 5 pages.
Gruber et al., "Planar-integrated optical vector-matrix multiplier," Applied Optics, vol. 39, p. 5367, Oct. 2000. 7 pages.
Gullans, M., et al., "Single-Photon Nonlinear Optics with Graphene Plasmons", Phys. Rev. Lett. 111, (Dec. 13, 2013), p. 247401-1-247401-5.
Gunn, C., "CMOS photonics for high-speed interconnects", Micro, IEEE 26, (Mar.-Apr. 2006), p. 58-66.
Haffner et al., Low-loss plasmon-assisted electro-optic modulator. Nature 556, 483 (2018). 17 pages.
Halasz et al., "Phase diagram of QCD," Physical Review D, vol. 58, p. 096007, Sep. 1998. 11 pages.
Hamerly et al., "Scaling advantages of all-to-all connectivity in physical annealers: the Coherent (sing Machine vs. D-Wave 2000Q," arXiv preprints, May 2018. 17 pages.
Harris et al. "Integrated source of spectrally filtered correlated photons for large-scale quantum photonic systems." Physical Review X 4.4 (2014): 041047. 10 pages.
Harris, N.C. et al. "Efficient, Compact and Low Loss Thermo-Optic Phase Shifter in Silicon", Optics Express, (Oct. 14, 2014), pp. 10487-10493.
Hinton et al., "Reducing the dimensionality of data with neural networks," Science 313, pp. 504-507 (2006).
Hochberg, M. et al., "Silicon Photonics: The Next Fabless Semiconductor Industry", Solid-State Circuits Magazine, IEEE 5, 48 (Feb. 4, 2013), 11 pages.
Honerkamp-Smith et al., "An introduction to critical points for biophysicists; observations of compositional heterogeneity in lipid membranes," Biochimica et Biophysica Acta (BBA)—Biomembranes, vol. 1788, pp. 53-63, Jan. 2009.
Hong, C. K. et al., "Measurement of subpicosecond time intervals between two photons by interference", Phys. Rev. Lett., vol. 59, No. 18, (Nov. 2, 1987), p. 2044-2046.
Hopefield et al., "Neural computation of decisions in optimization problems," Biological Cybernetics, vol. 52, No. 3, pp. 141-152. 1955.
Hopefield, "Neural networks and physical systems with emergent collective computational abilities.," Proceedings of the National Academy of Sciences of the United States of America, vol. 79, pp. 2554-8, Apr. 1982.
Horowitz, Computing's energy problem (and what we can do about it). In Solid-State Circuits Conference Digest of Technical Papers (ISSCC), 2014 IEEE International, 10-14 (IEEE, 2014).
Horst, F. et al., "Cascaded Mach-Zehnder wavelength filters in silicon photonics for low loss and flat pass-band WDM (de-)multiplexing", Optics Express, vol. 21, No. 10, (Mar. 5, 2013), pp. 11652-11658.

(56) References Cited

OTHER PUBLICATIONS

Humphreys, P. C. et al., "Linear Optical Quantum Computing in a Single Spatial Mode", arXiv:1305.3592, (Nov. 21, 2013), 7 pages.
Inagaki et al., Large-scale ising spin network based on degenerate optical parametric oscillators. Nature Photonics 10, 415 (2016).
Isichenko, "Percolation, statistical topography, and trans-port in random media," Reviews of Modern Physics, vol. 64, pp. 961-1043, Oct. 1992.
Jaekel et al., Quantum limits in interferometric measurements. EPL (Europhysics Letters) 13, 301 (1990).
Jalali, B. et al., "Silicon Photonics", Journal of Lightwave Technology, vol. 24, No. 12, (Dec. 2006), pp. 4600-4615.
Jia et al., "Caffe: Convolutional architecture for fast feature embedding," In Proceedings of the 22Nd ACM International Conference on Multimedia, MM '14, pp. 675-678 (ACM, New York, NY, USA, 2014). URL http://doi.acm.org/10.1145/2647868.2654889.
Jiang, L. et al., "A planar ion trapping microdevice with integrated waveguides for optical detection", Optics Express, vol. 19, No. 4, (2011), pp. 3037-3043.
Jonsson, An empirical approach to finding energy efficient ADC architectures. In Proc. of 2011 IMEKO IWADC & IEEE ADC Forum, 1-6 (2011).
Jouppi et al. In-datacenter performance analysis of a tensor processing unit. In Computer Architecture (ISCA), 2017 ACM/IEEE 44th Annual International Symposium on, 1-12 (IEEE, 2017).
Kahn et al., Communications expands its space. Nature Photonics 11, 5 (2017). 4 pages.
Kardar et al., "Dynamic Scaling of Growing Interfaces," Physical Review Letters, vol. 56, pp. 889-892, Mar. 1986.
Karpathy, A., "CS231n Convolutional Neural Networks for Visual Recognition," Class notes. Jan. 2018, http://cs231n.github.io/. Accessed Oct. 31, 2018. 2 pages.
Keckler et al., GPUs and the future of parallel computing. IEEE Micro 7-17 (2011).
Kieling, K. et al., "On photonic Controlled Phase Gates", New Journal of Physics, vol. 12, (Jul. 5, 2010), 9 pages.
Kim et al., A functional hybrid memristor crossbar-array/cmos system for data storage and neuromorphic applications. Nano Letters 12, 389-395 (2011).
Kirkpatrick et al., "Optimization by simulated annealing.," Science (New York, N. Y.), vol. 220, pp. 671-80, May 1983.
Knill et al., "The Bayesian brain: the role of uncertainty in neural coding and computation," Trends in Neurosciences, vol. 27, pp. 712-719, Dec. 2004.
Knill, E. et al., "A scheme for efficient quantum computation with linear optics", Nature 409, 4652 (Jan. 4, 2001), p. 46-52.
Knill, E., "Quantum computing with realistically noisy devices", Nature, vol. 434, (Mar. 3, 2005), p. 39-44.
Kok et al. "Linear optical quantum computing with photonic qubits." Reviews of Modern Physics 79.1 (2007): 135.40 pages.
Koos et al., Silicon-organic hybrid (SOH) and plasmonic-organic hybrid (POH) integration. Journal of Lightwave Technology, 34, 256-268 (2016).
Krizhevsky et al., Imagenet classification with deep convolutional neural networks. In Advances in neural information processing systems, 1097-1105 (2012).
Kucherenko, S. et al., "Application of Deterministic Low-Discrepancy Sequences in Global Optimization", Computational Optimization and Applications, vol. 30, (2005), p. 297-318.
Kwack, M-J et al., "Monolithic InP strictly non-blocking 8×8 switch for high-speed WDM optical interconnection," Optics Express 20(27), 28734-28741 (2012).
Lahini, Y. et al., "Anderson Localization and Nonlinearity in One-Dimensional Disordered Photonic Lattices", Phys. Rev. Lett., 100, (Feb. 7, 2008), 4 pages.
Lahini, Y. et al., "Quantum Correlations in Two-Particle Anderson Localization", Phys. Rev. Lett., 105, (Oct. 15, 2010), p. 163905-1-163905-4.
Laing, A. et al., "High-fidelity operation of quantum photonic circuits", Applied Physics Letters, vol. 97, (2010), 5 pages.
Landauer, Irreversibility and heat generation in the computing process. IBM Journal of Research and Development 5, 183-191 (1961).
Lanyon, B. P. et al., "Towards quantum chemistry on a quantum computer", Nature Chemistry 2, 106 (May 8, 2009), 20 pages.
Lawson et al., Basic linear algebra subprograms for Fortran usage. ACM Transactions on Mathematical Software (TOMS) 5, 308-323 (1979).
Lecun et al., "Deep learning," Nature, vol. 521, pp. 436-444, May 2015.
Lecun et al., Gradient-based learning applied to document recognition. Proceedings of the IEEE 86, 2278-2324 (1998).
Levi, L. et al., "Hyper-transport of light and stochastic acceleration by evolving disorder", Nat. Phys., vol. 8, (Dec. 2012), p. 912-917.
Li et al., Efficient and self-adaptive in-situ learning in multilayer memristor neural networks. Nature Communications 9, 2385 (2018). 8 pages.
Lin et al., All-optical machine learning using diffractive deep neural networks. Science 361, 1004-1008 (2018).
Macready et al., "Criticality and Parallelism in Combinatorial Optimization," Science, vol. 271, pp. 56-59, Jan. 1996.
Marandi et al., Network of time-multiplexed optical parametric oscillators as a coherent Ising machine. Nature Photonics 8, 937 (2014). 6 pages.
Martin-Lopez, E. et al., "Experimental realization of Shor's quantum factoring algorithm using qubit recycling", Nat Photon 6, (Oct. 24, 2012), 7 pages.
McMahon et al., "A fully programmable 100-spin coherent (sing machine with all-to-all connections.," Science (New York, N.Y.), vol. 354, pp. 614-617, Nov. 2016.
Mead, "Neuromorphic electronic systems," Proceedings of the IEEE 78, 1629-1636 (1990).
Migdall, A. L. et al., "Tailoring single-photon and multiphoton probabilities of a single-photon on-demand source", Phys. Rev. A 66, (May 22, 2002), 4 pages.
Mikkelsen, J.C. et al., "Dimensional variation tolerant silicon-on-insulator directional couplers", Optics Express, vol. 22, No. 3, (Feb. 10, 2014), p. 3145-3150.
Miller, Are optical transistors the logical next step? Nature Photonics 4, 3 (2010). 3 pages.
Miller, Attojoule optoelectronics for low-energy information processing and communications. Journal of Lightwave Technology 35, 346-396 (2017).
Miller, D. A. B., "Reconfigurable add-drop multiplexer for spatial modes", Optics Express, vol. 21, No. 17, (Aug. 26, 2013), pp. 20220-20229.
Miller, D. A. B., "Self-aligning universal beam coupler", Opt. Express, vol. 21, (Aug. 26, 2013), 6 pages.
Miller, D. A. B., "Perfect optics with imperfect components," Optica 2, pp. 747-750 (2015).
Miller, D. A. B., "Self-configuring universal linear optical component [invited]," Photonics Research 1, URL http://dx.doi.org/10.1364/PRJ.1.000001, 15 pages (2013).
Miller, Energy consumption in optical modulators for interconnects. Optics Express 20, A293-A308 (2012).
Misra et al., "Artificial neural networks in hardware: A survey of two decades of progress," Neurocomputing 74, pp. 239-255 (2010).
Mohseni, M. et al., "Environment-assisted quantum walks in photosynthetic complexes", The Journal of Chemical Physics 129, (May 18, 2008), 8 pages.
Moore, Cramming more components onto integrated circuits. Electronics 114-117 (1965).
Mower, J. et al., "Efficient generation of single and entangled photons on a silicon photonic integrated chip", Phys. Rev. A 84, (Oct. 18, 2011), 8 pages.
Nagamatsu et al., A 15-ns 32 32-bit cmos multiplier with an improved parallel structure. In Custom Integrated Circuits Conference, 1989., Proceedings of the IEEE 1989, 10-3 (IEEE, 1989). 4 pages.
Najafi, F. et al., "On-Chip Detection of Entangled Photons by Scalable Integration of Single-Photon Detectors", arXiv:1405.4244 [physics.optics] (May 16, 2014), 27 pages.

(56) References Cited

OTHER PUBLICATIONS

Nozaki et al., "Sub-femtojoule all-optical switching using a photonic-crystal nanocavity," Nature Photonics 4, pp. 477-483 (2010).
O'Brien, J. L. et al., "Demonstration of an all-optical quantum controlled-NOT gate", Nature 426, (Feb. 1, 2008), 5 pages.
Onsager, "Crystal Statistics. I. A Two-Dimensional Model with an Order-Disorder Transition," Physical Review, vol. 65, pp. 117-149, Feb. 1944.
Orcutt, J. S. et al., "Nanophotonic integration in state-of-the-art CMOS foundries", Optics Express, vol. 19, No. 3, (2011), pp. 2335-2346.
Pelissetto et al., "Critical phenomena and renormalization-group theory," Physics Reports, vol. 368, pp. 549-727, Oct. 2002.
Peng, Implementation of AlexNet with Tensorflow. https://github.com/ykpengba/AlexNet-A-Practical-Implementation (2018). Accessed Dec. 3, 2018. 2 pages.
Peretto, "Collective properties of neural networks: A statistical physics approach," Biological Cybernetics, vol. 50, pp. 51-62, Feb. 1984.
Pernice, W. et al., "High-speed and high-efficiency travelling wave single-photon detectors embedded in nanophotonic circuits", Nature Communications 3, 1325 (2012), 23 pages.
Peruzzo, A., et al., "Quantum walk of correlated particles", Science 329, (2010), 8 pages.
Politi, A. et al., "Integrated Quantum Photonics", IEEE Journal of Selected Topics in Quantum Electronics, vol. 5, Issue 6, (2009), 12 pages.
Politi, A. et al., "Silica-on-Silicon Waveguide Quantum Circuits", Science 320, (Feb. 1, 2008), 5 pages.
Poon et al., "Neuromorphic silicon neurons and large-scale neural networks: challenges and opportunities," Frontiers in Neuroscience, vol. 5, Article 108, 3 pages (2011).
Prucnal et al., "Recent progress in semiconductor excitable lasers for photonic spike processing," Advances in Optics and Photonics 8, pp. 228-299 (2016).
Psaltis et al., "Holography in artificial neural networks." Landmark Papers on Photorefractive Nonlinear Optics. 1995. 541-546.
Ralph, T. C. et al., "Linear optical controlled-NOT gate in the coincidence basis", Phys. Rev. A, vol. 65, (Jun. 20, 2002), p. 062324-1-062324-5.
Ramanitra et al., "Scalable and multi-service passive optical access infrastructure using variable optical splitters." Optical Fiber Communication Conference. Optical Society of America, 2006, 3 pages.
Raussendorf, R. et al., "A one-way quantum computer", Phys. Rev. Lett. 86, 5188-5191 (2001).
Rechtsman et al., "Photonic floquet topological insulators," Optical Society of America, Technical Digest, 2 pages (2013).
Reck et al., Experimental realization of any discrete unitary operator. Physical review letters 73, 58 (1994).
Reed, G. T. et al., "Silicon optical modulators", Nature Photonics, vol. 4, (2010), pp. 518-526.
Rendl et al., "Solving Max-Cut to optimality by intersecting semidefinite and polyhedral relaxations," Mathematical Programming, vol. 121, pp. 307-335, Feb. 2010.
Rios et al., "Integrated all-photonic non-volatile multilevel memory," Nature Photonics 9, pp. 725-732 (2015).
Rogalski, Progress in focal plane array technologies. Progress in Quantum Electronics 36, 342-473 (2012).
Aaronson, S. et al., "Computational complexity of linear optics", in Proceedings of the 43rd Annual ACM Symposium on Theory of Computing (ACM, New York, NY, USA, 2011), STOC '11, pp. 333-342, ISBN 978-1-4503-0691-1.
Abu-Mostafa et al., "Optical neural computers." Scientific American 256.3 (1987): 88-95.
Albert et al., "Statistical mechanics of com-plex networks," Reviews of Modern Physics, vol. 74, pp. 47-97, Jan. 2002.
Almeida, V. R., et al., "All-optical control of light on a silicon chip", Nature, vol. 431, (Aug. 6, 2004), pp. 1081-1084.

Amir, A. et al., "Classical diffusion of a quantum particle in a noisy environment", Physical Review, E 79, 050105 (Feb. 5, 2009), 5 pages.
Amit et al., "Spin-glass models of neural networks," Physical Review A, vol. 32, pp. 1007-1018, Aug. 1985.
Anitha et al., Comparative study of high performance brauns multiplier using fpga. IOSR J Electron Commun Eng (IOSRJECE) 1, 33-37 (2012).
Appeltant et al., "Information processing using a single dynamical node as complex system," Nature Communications2, 6 pages (2011).
Arjovsky et al., "Unitary Evolution Recurrent Neural Networks," arXiv:1511.06464, 9 pages (2015).
Aspuru-Guzik A. et al., "Simulated Quantum Computation of Molecular Energies", Science 309, 1704 (2005), 21 pages.
Aspuru-Guzik, A. et al., "Photonic quantum simulators", Nat. Phys., 8, 285 (2012), 29 pages.
Atabaki et al., Integrating photonics with silicon nanoelectronics for the next generation of systems on a chip. Nature 556, 349 (2018). 10 pages.
Baehr-Jones, T. et al., "A 25 Gb/s Silicon Photonics Platform", arXiv:1203.0767 (2012), 11 pages.
Bao et al., "Atomic-Layer Graphene as a Saturable Absorber for Ultrafast Pulsed Lasers," Advanced Functional Materials 19, pp. 3077-3083 (2009).
Bao et al., "Monolayer graphene as a saturable absorber in a mode-locked laser," Nano Research, vol. 4, pp. 297-307, Mar. 2011.
Barahona, "On the computational complexity of Ising spin glass models," Journal of Physics A: Mathematical and General, vol. 15, pp. 3241-3253, Oct. 1982.
Bertsimas et al., "Robust optimization with simulated annealing," Journal of Global Optimization 48, pp. 323-334 (2010).
Bewick, Fast multiplication: algorithms and implementation. Ph.D. thesis, Stanford University (1994). 170 pages.
Bonneau et al., "Quantum interference and manipulation of entanglement in silicon wire waveguide quantum circuits." New Journal of Physics 14.4 (2012): 045003. 13 pages.
Brilliantov, "Effective magnetic Hamiltonian and Ginzburg criterion for fluids," Physical Review E, vol. 58, pp. 2628-2631, Aug. 1998.
Bromberg, Y. et al., "Bloch oscillations of path-entangled photons", Phys. Rev. Lett., vol. 105, (May 18, 2011), 5 pages.
Bromberg, Y. et al., "Quantum and Classical Correlations in Waveguide Lattices", Phys. Rev. Lett. 102, (Jun. 26, 2009), p. 253904-1-253904-4.
Broome, M. A. et al., "Photonic Boson Sampling in a Tunable Circuit", Science 339, 794 (Dec. 20, 2012), 6 pages.
Bruck et al., "On the power of neural networks for solving hard problems," Journal of Complexity, vol. 6, pp. 129-135, Jun. 1990.
Canziani et al., A. Evaluation of neural network architectures for embedded systems. In Circuits and Systems (ISCAS), 2017 IEEE International Symposium on, 1-4 (IEEE, 2017).
Cardenas, J. et al., "Low loss etchless silicon photonic waveguides", Optics Express, vol. 17, No. 6, (Mar. 16, 2009), pp. 4752-4757.
Carolan et al., "Universal linear optics," Science, vol. 349, pp. 711-716, Aug. 2015.
Caves, Quantum-mechanical noise in an interferometer. Physical Review D 23, 1693 (1981). 16 pages.
Centeno et al., "Optical bistability in finite-size nonlinear bidimensional photonic crystals doped by a microcavity," Phys. Rev., vol. 62, No. 12, pp. R7683-R7686 (2000).
Chen et al., DianNao: A small-footprint high-throughput accelerator for ubiquitous machine-learning. ACM Sigplan Notices 49, 269-284 (2014).
Chen, J. et al., "Efficient photon pair sources based on silicon-on-insulator microresonators", SPIE, vol. 7815, (2010), 9 pages.
Chen, J. et al., "Frequency-bin entangled comb of photon pairs from a Silicon-on-Insulator micro-resonator"Optics Express, vol. 19, No. 2, (Jan. 17, 2011), pp. 1470-1483.
Chen, L. et al., "Compact, low-loss and low-power 8×8 braodband silicon optical switch," Optics Express 20(17), 18977-18985 (2012).
Chen, Q. et al., "A Universal method for constructing N-port non-blocking optical router based on 2×2 optical switch", Optics Express 22, 12614 (Aug. 25-28, 2014), p. 357-361.

(56) References Cited

OTHER PUBLICATIONS

Cheng et al., "In-Plane Optical Absorption and Free Carrier Absorption in Graphene-on-Silicon Waveguides," IEEE Journal of Selected Topics in Quantum Electronics, vol. 20, pp. 43-48, Jan. 2014.

Chetlur et al., cuDNN: Efficient primitives for deep learning. arXiv preprint arXiv:1410.0759 (2014). 9 pages.

Childs, A. et al., "Spatial search by quantum walk", Physical Review A, 70 (2), 022314 (Aug. 25, 2004), 12 pages.

Chung et al., A monolithically integrated large-scale optical phased array in silicon-on-insulator cmos. IEEE Journal of Solid-State Circuits 53, 275-296 (2018).

Cincotti, "Prospects on planar quantum computing." Journal of Lightwave Technology 27.24 (2009): 5755-5766.

Clements et al., "Optimal design for universal multiport interferometers," Optica, vol. 3, p. 1460, Dec. 2016. 6 pages.

Crespi, A. et al., "Integrated multimode interferometers with arbitrary designs for photonic boson sampling", Nat Photon 7, (May 26, 2013), p. 545-549.

Crespi, et al., "Anderson localization of entangled photons in an integrated quantum walk", Nat Photon 7, 322 (Apr. 3, 2013), 7 pages.

Dai, D. et al., "Novel concept for ultracompact polarization splitter-rotator based on silicon nanowires", Optics Express, vol. 19, No. 11, (May 23, 2011), pp. 10940-10949.

Di Giuseppe, G. et al., "Einstein-Podolsky-Rosen Spatial Entanglement in Ordered and Anderson Photonic Lattices", Phys. Rev. Lett. 110, (Apr. 12, 2013), p. 150503-1-150503-5.

Dunningham et al., "Efficient comparison of path-lengths using Fourier multiport devices." Journal of Physics B: Atomic, Molecular and Optical Physics 39.7 (2006): 1579. 9 pages.

E. Ising, "Beitrag zur Theorie des Ferromagnetismus," Z. Phys., 1925. 6 pages.

Esser et al., "Convolutional networks for fast, energy-efficient neuromorphic computing," Proceedings of the National Academy of Sciences 113, 11,441-11,446 (2016).

Farht et al., "Optical implementation of the Hopfield model," Applied Optics, vol. 24, p. 1469, May 1985. 7 pages.

Feinberg et al., Making memristive neural network accelerators reliable. In 2018 IEEE International Symposium on High Performance Computer Architecture (HPCA), 52-65 (IEEE, 2018).

Fushman, I. et al., "Controlled Phase Shifts with a Single Quantum Dot", Science, vol. 320, (May 9, 2008), p. 769-772.

\* cited by examiner

APPARATUS, SYSTEMS, AND METHODS FOR NONBLOCKING OPTICAL SWITCHING

CROSS-REFERENCE TO RELATED APPLICATIONS

This application claims the priority benefit under 35 U.S.C. § 119(e) of U.S. Application No. 62/507,390, filed May 17, 2017, entitled "OPTICAL NETWORK SWITCH FOR DYNAMICALLY RECONFIGURABLE MULTI-CAST TOPOLOGIES," which is hereby incorporated herein by reference in its entirety.

GOVERNMENT SUPPORT

This invention was made with Government support under Grant No. FA8702-15-D-0001 awarded by the United States Air Force. The Government has certain rights in the invention.

BACKGROUND

Increasing network demands are driving the replacement of copper communications infrastructure with optical fiber. This process began at the continent scale with long-haul links. More recently, fiber has penetrated the metropolitan area networks (MANs) and the aggregation layers of large datacenters. With cloud computing driving demands on datacenter networks, optical communications has already begun to be implemented at the individual server level.

Traditionally, optical networks were wired statically; more recently, networks in which the geometry can be adapted have been implemented via several approaches. One approach employs reconfigurable add-drop multiplexers (ROADMs), which are used in wavelength division multiplexing (WDM) systems to add or remove one spectral component (at one single wavelength) while passing others. More recently, software defined networking has driven the adoption of more fluid physical architectures.

Existing architectures for optical switches are either based on microelectromechanical systems (MEMS) or collimators aided with piezoelectric drivers. These free-space switches are large, expensive, and usually include complex feedback systems to physically align the free-space optical paths internally.

SUMMARY

Embodiments of the present invention include apparatus, systems, and methods for nonblocking optical switching. In one example, a method of nonblocking optical switching includes guiding a first optical beam from a first input to a first output via a first path through an optical switching fabric. The first path traverses a phase shifter disposed between a pair of cascaded Mach-Zehnder interferometers. The method also includes receiving a second optical beam for a second path through the optical switching fabric. The second path intersects with the first path. The method also includes moving the first optical beam from the first path to a third path through the optical switching fabric. The third path connects the first input to the first output without intersecting the second path. The method also includes shifting a phase of the first optical beam, with the phase shifter, while moving the first optical beam from the first path to the third path to prevent the first optical beam from interfering with the second optical beam.

In another example, a reconfigurable, nonblocking optical switch includes a substrate and an optical switching fabric integrated on the substrate. The optical switching fabric is configured to guide a first optical beam from a first input of the optical switching fabric to a first output of the optical switching fabric via a first path. The first path traverses a phase shifter disposed between a pair of cascaded Mach-Zehnder interferometers in the optical switching fabric. The optical switching fabric is also configured to receive a second optical beam for a second path through the optical switching fabric, and the second path intersects with the first path. The optical switching fabric is further configured to move the first optical beam from the first path to a third path through the optical switching fabric, and the third path connects the first input to the first output without intersecting the second path. The optical switching fabric is also configured to shift a phase of the first optical beam while moving the first optical beam from the first path to the third path to prevent the first optical beam from interfering with the second optical beam.

In yet another example, an optical network includes a nonblocking optical switch and a plurality of computer servers. The nonblack network switch includes a substrate, a plurality of input ports fabricated in the substrate to receive a plurality of input optical beams, and a plurality of interconnected Mach-Zehnder interferometers (MZIs), in optical communication with the plurality of input ports, to perform an arbitrary uniform transformation of the plurality of input optical beams so as to generate a plurality of output optical beams. The nonblocking network switch also includes a plurality of output ports, in optical communication with the plurality of interconnected MZIs, to output the plurality of output optical beams. Each computer server in the plurality of computer servers includes an input interface optically coupled to a corresponding input port in the plurality of input ports and an output interface optically coupled to a corresponding output port in the plurality of output ports. The network also includes a controller, operably coupled to the plurality of computers and the nonblocking optical switch, to control communication between a first computer server in the plurality of computer servers and a second computer server in the plurality of computer servers via the nonblocking switch.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Overview

Figure 1A:
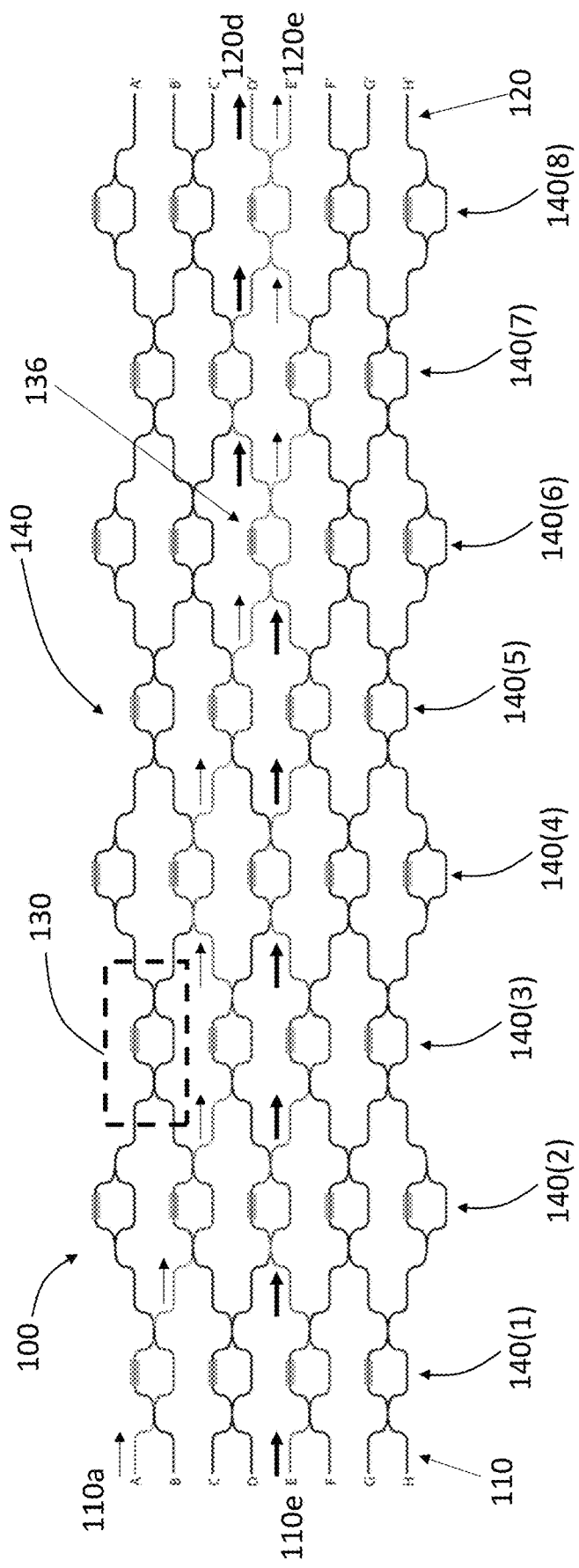
FIGS. 1A-1F illustrate operation of a switch including a network of Mach-Zehnder Interferometers (MZIs) without external phase shifters.

Integrated photonics may be used to reduce the size, weight, and cost of optical switches. Two architectures can be used to construct photonic optical switches. The first architecture includes a mesh of ring resonators that can be tuned to direct light to the desired channel. However, it may be challenging to fabricate ring resonators in a mass production setting. In addition, the ring resonators are usually sensitive to thermal fluctuations over the surface of the chip that includes the switches. Accordingly, feedback mechanisms are usually included for each ring to hold the ring in place (e.g., to stabilize the resonant wavelength), thereby increasing the size and cost.

The second architecture is based on 2×2 Mach-Zehnder switches with only internal phase shifters typically wired in a Benes topology, which is a variant of a Clos network topology that uses 2×2 switches and is nonblocking. Existing Mach-Zehnder topologies are usually "reconfigurably non-blocking," i.e., while the inputs can be connected to the outputs in any configuration, an existing connection is usually rebroken (broken and reconnected) before changing that configuration. In fact, even the issue of finding paths that work well within the switch remains an active area of research, adding complexity to the operation of these systems.

The drawback arising out of lacking reconfigurable nonblocking capability is aggravated by the fact that there are generally no buffers in the optical domain. Therefore, when a light path is broken temporarily, the data that is transmitted while the path is broken. Alternatively, one needs to coordinate with the originator of that light to stop sending light, reconfigure the switch, and resume sending light to restart the transmission, thereby resulting in large amount of excess scheduling or loss of traffic.

Existing optical switch architectures (including both integrated photonic and free-space architectures) are also based on the same premise: a single input port is connected to, at most, one output port. There are some small optical switches allowing one input to be split into multiple outputs. This multicast scheme is desirable because it can reduce the number of transceivers by transmitting data for multiple destinations on a single wavelength and then splitting the light to multiple end users. However, existing multicast switches typically employ a "split-and-select" architecture, where each of the N inputs is split to each of the M outputs, and then a N×1 switch at each output selects the desired input. Accordingly, regardless of the configuration of the switch, only 1/N of the input power arrives at each output.

To address the drawbacks in existing optical switches, apparatus, systems, and methods described herein employ a strictly nonblocking architecture to construct network switches based on 2×2 Mach-Zehnder Interferometers (MZIs). This nonblocking architecture can switch from one optical path to another without blocking existing optical paths. Additionally, this architecture can be configured as an efficient multicast switch, which can split arbitrary fractions of the input power to each of the output ports.

The nonblocking architecture includes a mesh of MZIs of a certain depth. Each MZI includes at least one internal phase shifter (disposed on at least one interference arm of the MZI) and at least one external phase shifter (coupled to an output of the MZI). An arbitrary unitary transformation of input optical modes can be implemented on this architecture.

To the best of inventors' knowledge, this is the first time the network of MZIs is employed to construct a network switch, that is strictly nonblocking. Operation of the network switch (e.g., reconfiguration) can be based on the phases of MZIs in the network switch and can be controlled by computer-implemented methods. In addition, the switching of the network traffic in the multicast configuration can be lossless, so arbitrary split power can be sent to each output.

Optical Switching with MZIs

Figure 1B:
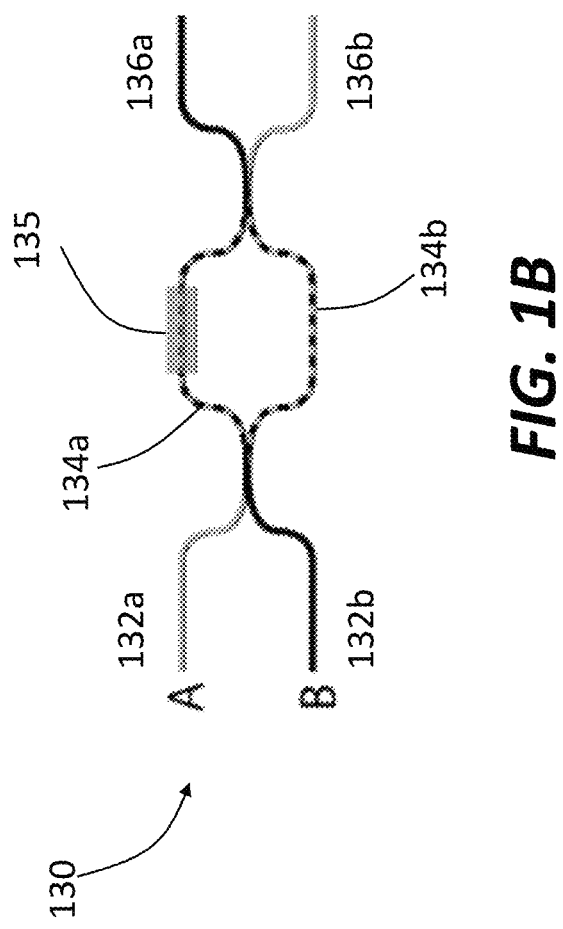

FIGS. 1A-1F illustrate operation of a switch 100 (also referred to as a switch fabric 100) including a network 140 of MZIs 130 without external phase shifters. The switch 100 includes 8 layers 140(1) to 140(8) of MZIs 130 (FIG. 1A), but any other numbers of layers can also be used. The switch 100 also includes 8 input ports 110 and 8 output ports 120m so it is an 8×8 switch. FIG. 1B shows a schematic of one MZI 130 used in the switch 100. The MZI 130 includes two input arms 132a and 132b, two interference arms 134a and 134b, and two output arms 136a and 136b. A phase shifter 135 is disposed on one interference arm 134a to change the interference of beams propagating in the two interference arms 134a and 134b.

In FIG. 1A, the input 110a is optically connected to the output 120e via the beam path (also referred to as lightpath) labelled by thin arrows, and the input 110e is optically connected to the output 120d via the beam path labelled by thick arrows. The two paths cross at the MZI 136 on the sixth layer 140(6).

Figure 1C:
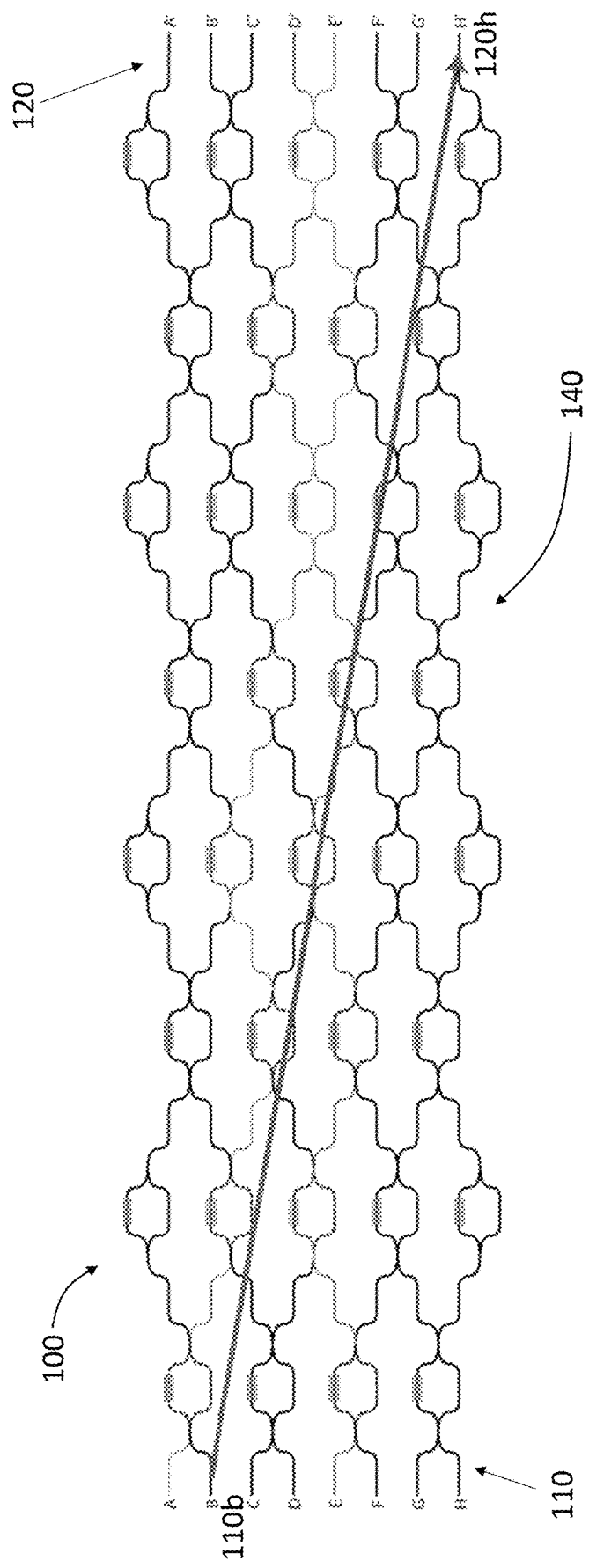

FIG. 1C illustrates a desired path from input 110b to output 120h (as indicated by the diagonal long arrow). With the hardware configuration shown in FIG. 1A, it can be challenging to optically connect input 110b to the output 120h. This is because the reconfiguration changes some of the MZIs in the two existing paths (i.e. 110a to 120e and 110e to 120d) from the "bar" configuration into the "cross" configuration, thereby disturbing these two paths.

Figure 1D:
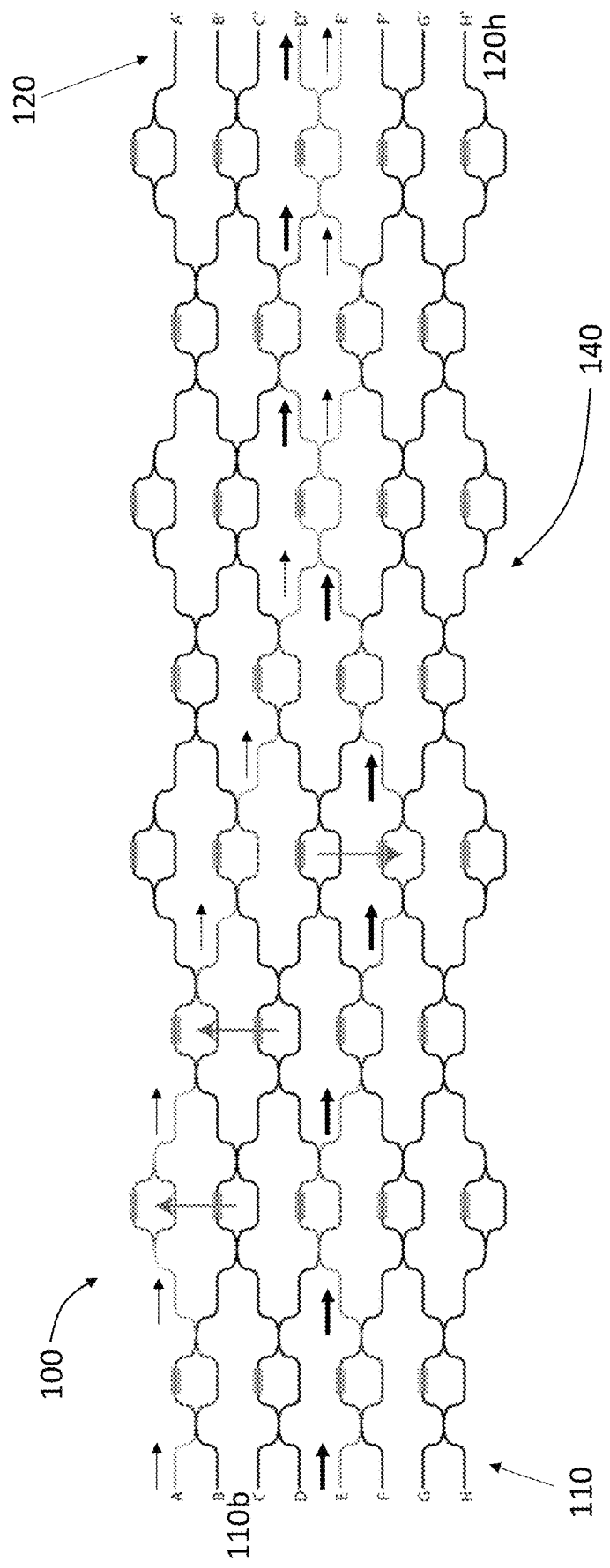

In order to optically connect the input 110b to the output 120h, the two existing paths can be modified to accommodate the new path from input 110b to output 120h. The new paths are illustrated in FIG. 1D. The modified paths (labelled by thin and thick arrows) still connect input 110a with output 120e and connect input 110e with output 120d.

Figure 1E:
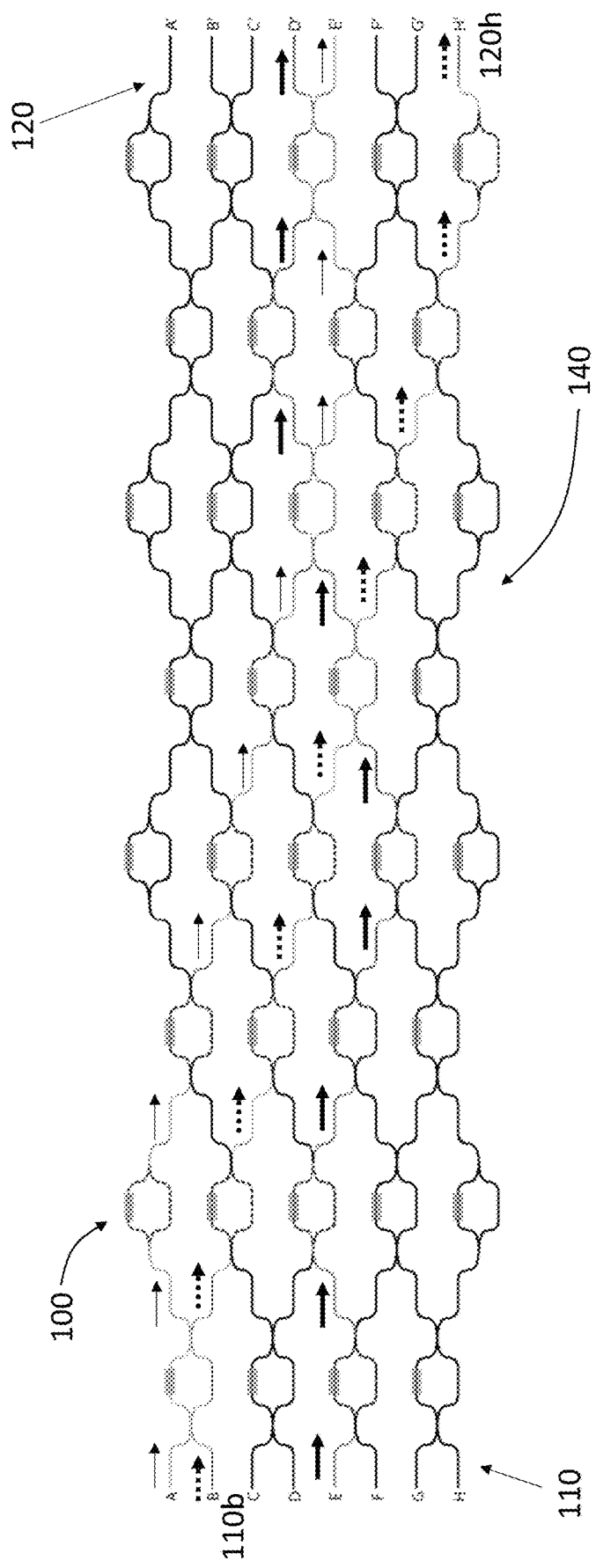
Figure 1F:
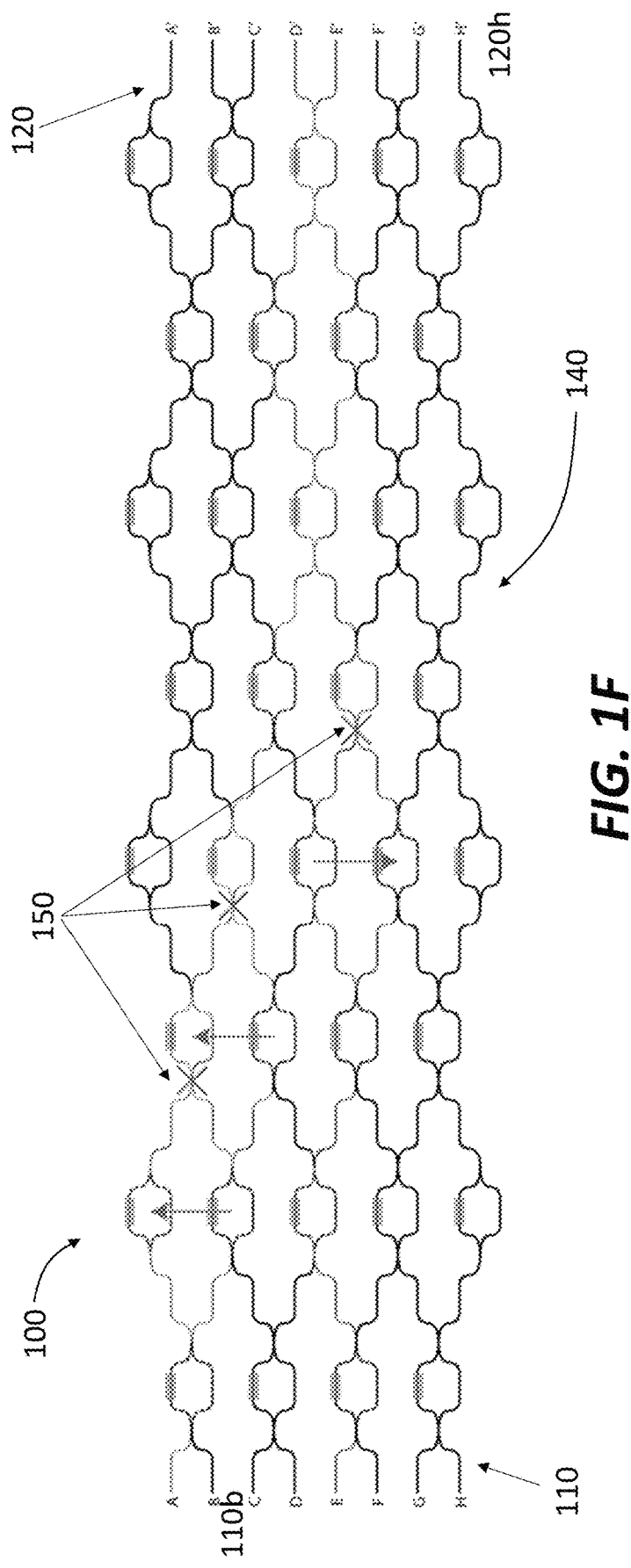

FIG. 1E shows that a third optical path (labelled by dashed arrows) is established to optically connect the input 110b to the output 120h. In this configuration, the three paths (i.e., 110a to 120e, 110b to 120h, and 110e to 120d) can transmit data concurrently.

Although the procedure illustrated in FIGS. 1D and 1E can establish the desired optical path between 110b and 120h, such reconfiguration is not instantaneous. Instead, while the paths are being reconfigured, uncontrolled interference can occur at locations 150 illustrated in FIG. 1F. The crosses indicate locations 150 where optical paths meet and their phases are not controllable. Uncontrolled destructive interference can cause information loss, whereas uncontrolled constructive interference can cause the appearance of spurious bits. This means it can be challenging to reroute the light inside the switch 100 without either pausing the data transfer on the existing optical paths or losing some data during the rearrangement due to uncontrolled interference. The problem also occurs in switches with a Benes or arbitrary Clos topology.

Nonblocking Optical Switching with MZIs and External Phase Shifters

Figure 2A:
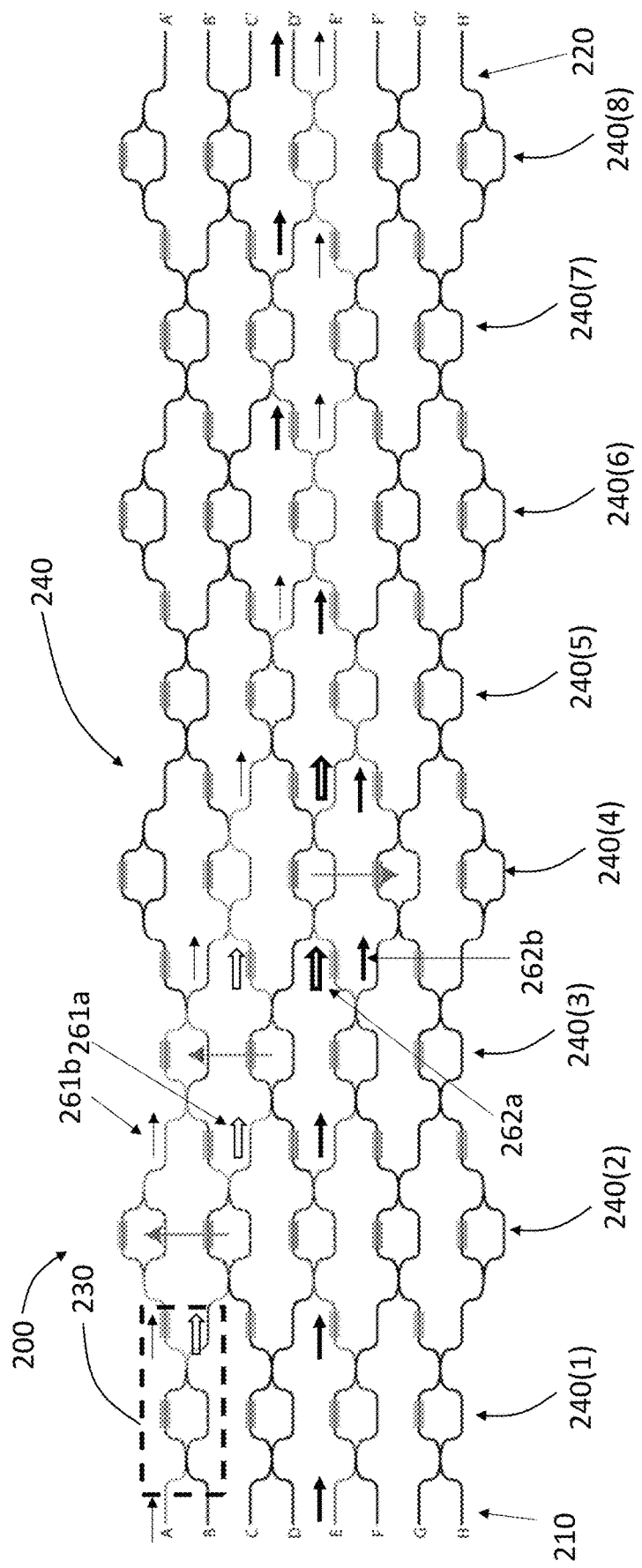
FIGS. 2A-2C illustrate nonblocking optical switching using MZIs with both internal and external phase shifters.
Figure 2B:
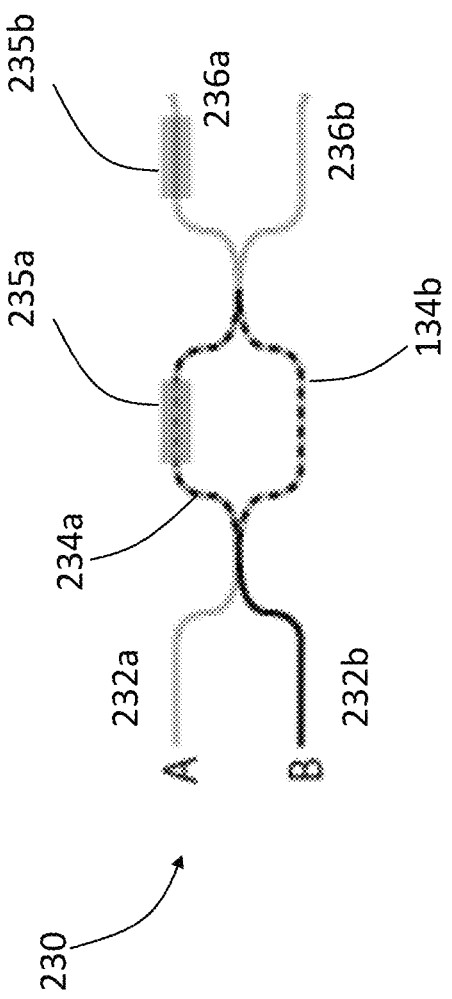
Figure 2C:
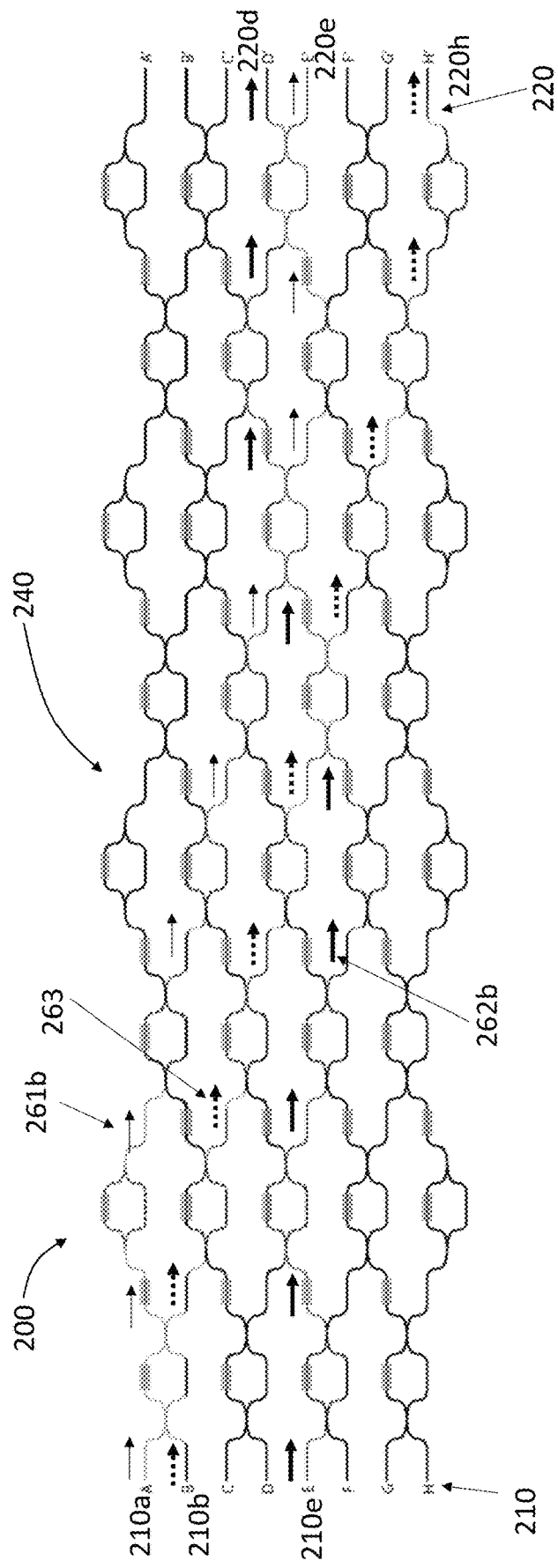

FIGS. 2A-2C illustrate nonblocking optical switching using MZIs with both internal and external phase shifters. FIG. 2A shows a schematic of a nonblocking switch 200 during rearrangement of optical paths. The switch 200 includes 8 layers 240(1) to 240(8) of MZIs 230 to form a network 240. The switch 200 also includes 8 input ports 210 and 8 output ports 220. Each MZI 230 (except those on the last layer 240(8)), as illustrated in FIG. 2B, includes two input 232a and 232b, two interference arms 234a and 234b, and two output 236a and 236b. A first phase shifter 235a (also referred to as the internal phase shifter 235a) is disposed on an interference arm (e.g., 234a), and a second phase shifter 235b (also referred to as an external phase shifter 235b) is coupled to an output (e.g., 236a).

The introduction of the external phase shifter 235b to the MZI 230 allows the MZI 230 to split an input light beam (e.g., from input 232a and/or input 232b) at an arbitrary ratio across the two outputs 236a and 236b. The switch 200 is therefore capable of producing an arbitrary linear transformation on light beams (also referred to as optical modes) received by the input ports 210. More information about arbitrary linear transformations can be found in U.S. Pat. No. 9,354,039, entitled "METHODS, SYSTEMS, AND APPARATUS FOR PROGRAMMABLE QUANTUM PHOTONIC PROCESSING," which is hereby incorporated herein by reference in its entirety.

The dimension of the switch 200 can be generally written as N×M, where N is the number of input ports 210, M is the number of output ports 220. In one example, N is equal to M (e.g., 4×4, 16×16, 32×32, 64×64, etc.). In another example, N can be different from M (e.g., N can be either greater or less than M). The entire network 240 of MZIs 230 can be fabricated on a semiconductor substrate (see, e.g., FIG. 7). The substrate can be transparent at the operating wavelength of the switch (e.g., the visible to the mid-infrared region of the electromagnetic spectrum). Examples of suitable semiconductor substrate materials include, but are not limited to, silicon, gallium phosphide, silicon nitride, silicon oxynitride, gallium arsenide, gallium nitride, indium phosphide, lithium niobate, chalcogenides, and silica-on-silicon. The phase shifters 235a and 235b can include any appropriate type of phase shifters (also referred to as phase modulators), such as thermo-optic phase shifters and electro-optic phase shifters.

The rearrangement in FIG. 2A involves two optical paths. The first optical path connects input port 210a with output port 220d: the path before rearrangement is labelled as 261a (block arrow) and the path after rearrangement is labelled as 261b (thin arrow). The second optical path connects input port 210e with output port 220d: the path before rearrangement is labelled as 262a (thick block arrow) and the path after rearrangement is labelled as 262b (thick arrow).

During the rearrangement, the external phase shifters 235b in the MZIs 230 can delay the light beams such that the light beams do not interfere with each other in an uncontrolled fashion. For example, the external phase shifters 235b in the MZIs 230 can set the phases of the two paths such that they constructively interfere into the desired output mode with no scattering into other modes. As shown in FIG. 2A, the rearrangement of the first optical path includes reconfiguration of MZIs on the second layer 240(2) and the third layer 240(3), as indicated by the vertical arrows. External phase shifters in the MZIs in these two layers 240(2) and 240(3) can be set to avoid interference of light beams at locations immediately after these two layers 240(2) and 240(3), i.e., between 240(2) and 240(3) and between 240(3) and 240(4). Similarly, the rearrangement of the second optical path includes reconfiguration of MZIs on the fourth layer 240(4), and external phase shifters in the MZI in the fourth layer 240(4) can be set to avoid interference of light beams between the fourth layer 240(4) and the fifth layer 240(5). In other words, any potential interference of light beams from different optical paths can be controlled by the phase shifters 235a/b (controlled by a controller, see, e.g., 740 in FIGS. 7 and 840 in FIG. 8), thereby allowing optical paths to be rearranged without interruption or loss.

After the lossless rearrangement as shown in FIG. 2A, a third optical path 263 (labelled by dashed arrows) can be established to connect input port 210b without output port 220h. FIG. 2C shows that the three paths 261b, 262b, and 263 can transmit data concurrently: the first path 261b connects input 210a to output 220e, the second path 262b connects input 210e with output 220d, and the third path 263 connects input 210b with output 220h.

Multicast Switching

Figure 3:
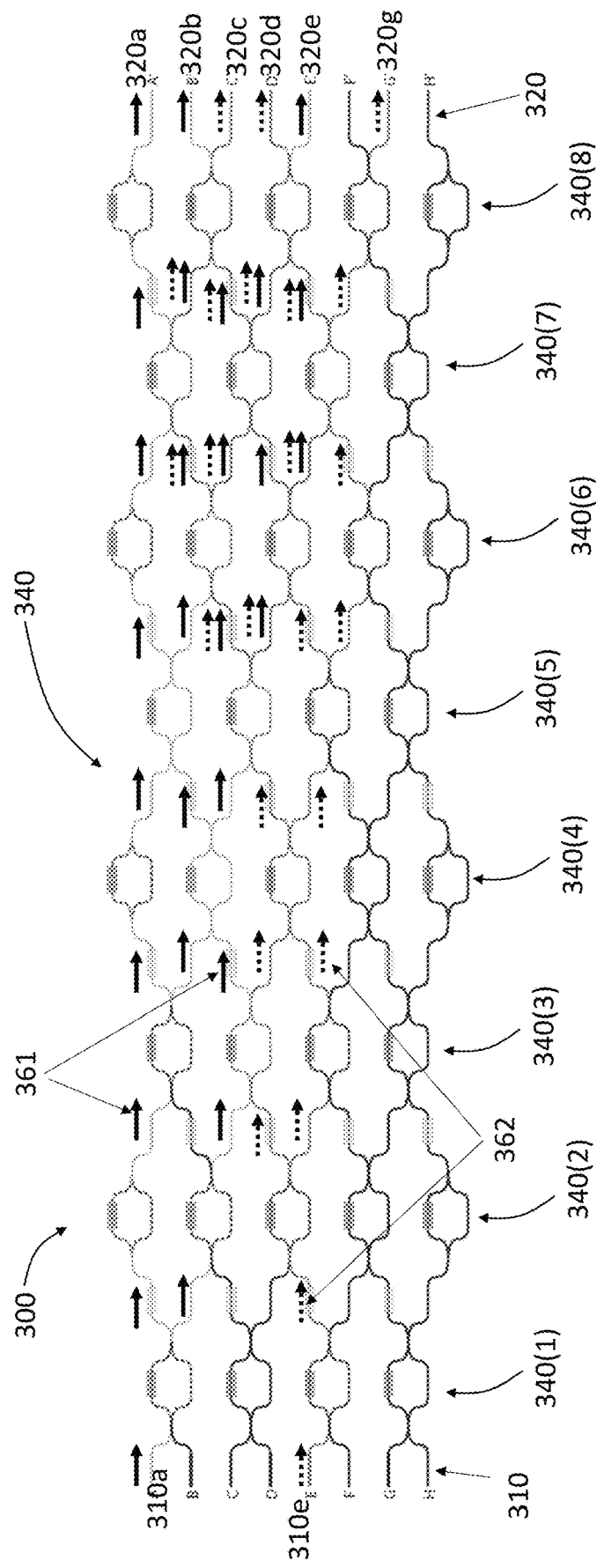
FIG. 3 illustrates multicast switching using the switch shown in FIG. 2A.

FIG. 3 illustrates multicast switching using a switch 300 that is substantially identical to the switch 200 shown in FIGS. 2A-2C and configured for multicast switching. The switch 300 includes a network 340 of MZIs having 8 layers 340(1) to 340(8). The switch 300 includes 8 input ports 310 and 8 output ports 320. As illustrated in FIG. 3, light beam received by input port 310a is multicast to three output ports 320a, 320b, and 320e via optical path 361 (labelled with solid arrows). In the optical path 361, some MZIs (e.g., on the first layer 340(1) and the fifth layer 340(5)) split received light beams into two portions and output the split beams via their two outputs. Similarly, light beams received by input port 310e is multicast to three output ports 320c, 320d, and 320g via optical path 362. This configuration shown in FIG. 3 can be rearranged to transmit light beams received by one input port 310 to any one or more output ports 320. Light beams propagating in the first optical path 361 and the second optical path 362 can have the same wavelength or different wavelengths (e.g., in a wavelength division multiplexing (WDM) scheme).

The multicast switching illustrated in FIG. 3 shows several beneficial features for practical applications, such as optical communications. First, single input signals received by each input port 310 can be directed to multiple different output ports 320 simultaneously. Second, signals can overlap internally but still be separated at the outputs (this occurs due to the self-interference of the signals). For example, light beams in the two optical paths 361 and 362 overlap after the fifth layer 340(5), as indicated by the overlap of both solid and dashed arrows on some waveguides between adjacent layers. But this overlap is temporary, and the light beams separate from each other to reach their corresponding outputs. Third, full unitary control of the switch 300 (i.e., capability of performing arbitrary unitary transformation) means the power distribution of input signal at the output ports 320 can be independent of internal interactions of the signals within the network 340.

Methods of Nonblocking Optical Switching and Multicasting

Figure 4:
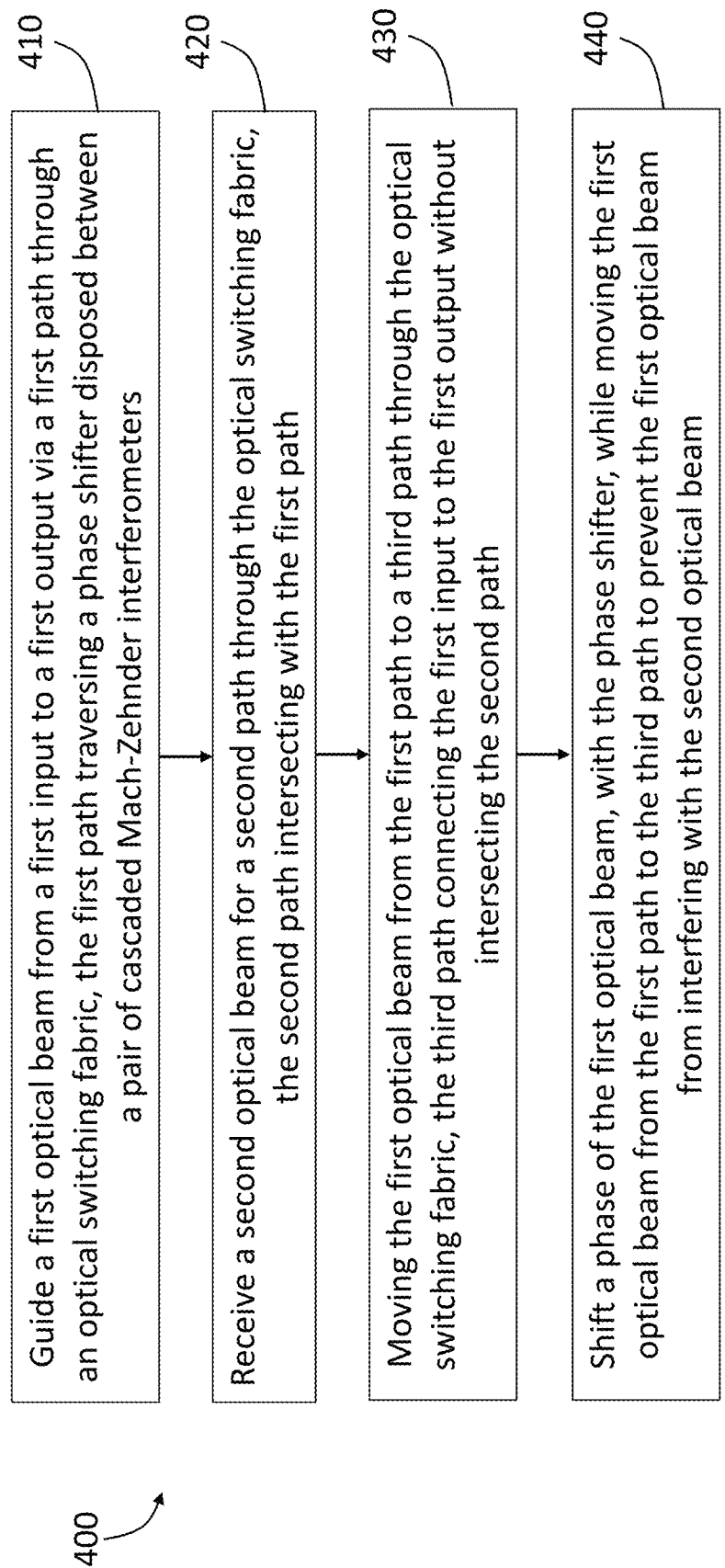
FIG. 4 illustrates a method of nonblocking optical switching using MZIs with both internal and external phase shifters.

FIG. 4 illustrates a method 400 of nonblocking optical switching using, for example, the switch 200 shown in FIG. 2A. The method 400 includes, at 410, guiding a first optical beam from a first input (e.g., 210a in FIG. 2A) to a first output (e.g., 220e in FIG. 2A) via a first path (e.g., 261a) through an optical switching fabric. The first path traverses at least one phase shifter (also referred to as external phase shifter) disposed between a pair of cascaded Mach-Zehnder interferometers (MZIs). In other words, the external phase shifter is not disposed in an interference arm of an MZI. The method 400 also includes, at 420, receiving a second optical beam for a second path (e.g., 262a) through the optical switching fabric. The second path intersects the first path. A controller (e.g., a computer) can be used to control the switch. The controller can simulate the state of the switch to find intersections between the first path and the second path.

At 430, the first optical beam is moved from the first path to a third path (e.g., 261b) through the optical switching fabric. The third path connects the first input to the first output without intersecting the second path, thereby allowing the establishment of additional optical path(s), such as the optical path 263 in FIG. 2C. This third path can be identified via several methods. For example, the controller can plot all possible paths between the first input port and the first output port. Out of these possible paths, the controller can identify those paths that do not intersect with the second path. Finally, out of these non-intersecting paths, the controller can determine the path that can be established from the first path with fewest changes of the phase settings of the MZI).

At 440, the phase shifter is employed to shift the phase of the first optical beam while moving the first optical beam from the first path to the third path to prevent the first optical beam from interfering with the second optical beam. The phase shifter can also allow moving the first optical beam without causing the first optical beam to scatter/leak into other modes during the move. For example, a phase shift of 0 can be used for a "swap" operation, and a phase shift of π can be used for a "bar" operation. As used herein, the "swap" operation (also referred to as a "cross" operation) refers to the operation in a 2×2 switch, where the top input (e.g., 232a in FIG. 2B) is connected to the bottom output (e.g., 236b in FIG. 2B) and the bottom input (e.g., 232b in FIG. 2B) is connected to the top output (e.g., 236a in FIG. 2B). The "bar" operation refers to the operation where the top input is connected to the top output and the bottom input is connected to the bottom output. In unicast operations (e.g., illustrated in FIG. 2C), these phases settings can be sufficient. Phase shifts between 0 and π can be used in multicast operations. Simulation of the switch state can be used to ensure that correct phases are applied to the light beams.

The time for the first optical beam to be moved from the first path to the second path can depend on, for example, the response time of the phase shifters in the switch. This time can be independent of the number of MZIs in the switch. Therefore, even for a large-scale network of MZIs (e.g., more than 64 inputs), new paths can still be quickly established. In practice, such rearrangement can occur within 1 ms (e.g., about 1 ms, about 500 µs, about 300 µs, about 200 µs, about 100 µs or less, including any values and sub ranges in between).

The method 400 can also be adapted for multicast switching. For example, the second optical beam can be split into multiple portions, each of which is guided to a corresponding output. In addition, the power splitting among these portions can be controlled by the phase shifters in the switch. The desired power splitting can be achieved using methods such as the Reck-Zeilinger method. As described above, the switch is capable of performing an arbitrary unitary transformation on the input optical beams. In the Reck-Zeilinger method, a unitary matrix having the desired power splitting is first selected (e.g., using a controller). Then the phase setting of the switch can be configured to produce this selected unitary matrix.

In another example, a gradient search method can also be used. In this method, the difference between the desired unitary matrix and the currently configured matrix is used to calculate a cost using a distance metric (e.g., the $L^2$ metric). This is then fed to a gradient descent algorithm that optimizes the phases applied to the system until the desired unitary (in simulation) is achieved.

Networks Including Nonblocking Optical Switches

Figure 5A:
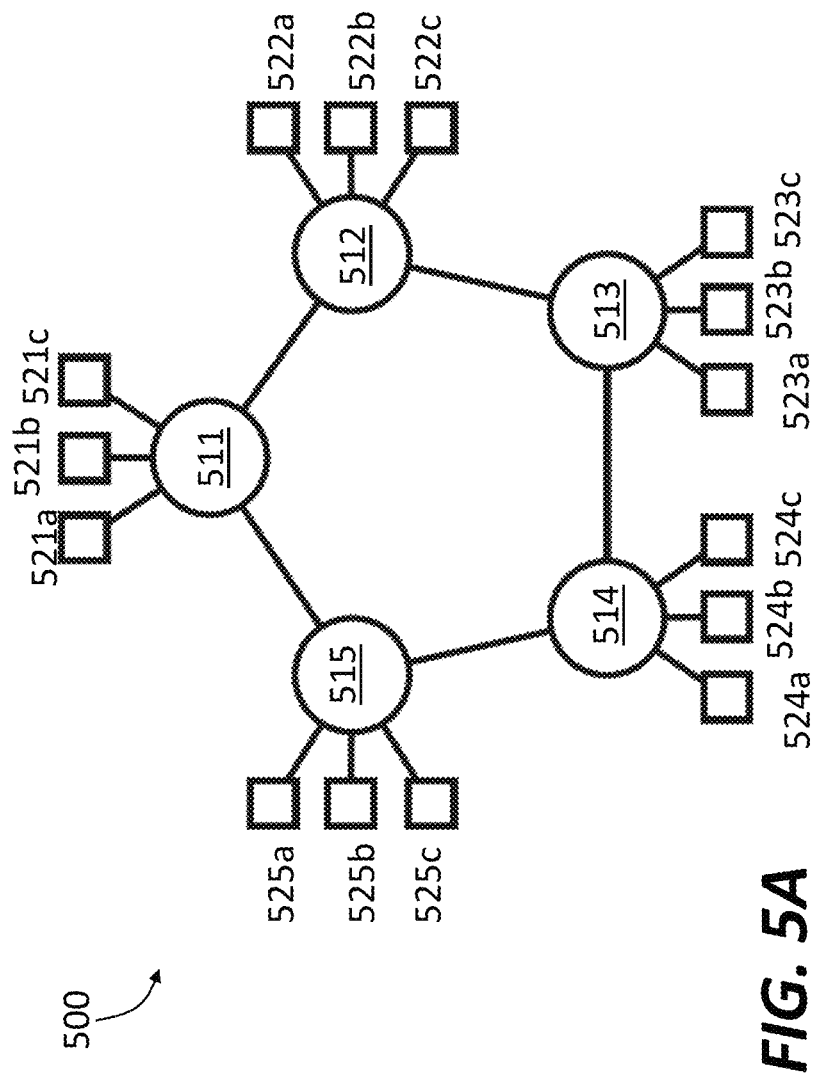
FIGS. 5A-5B illustrate operation of a network including routers connected by electrical switches.
Figure 5B:
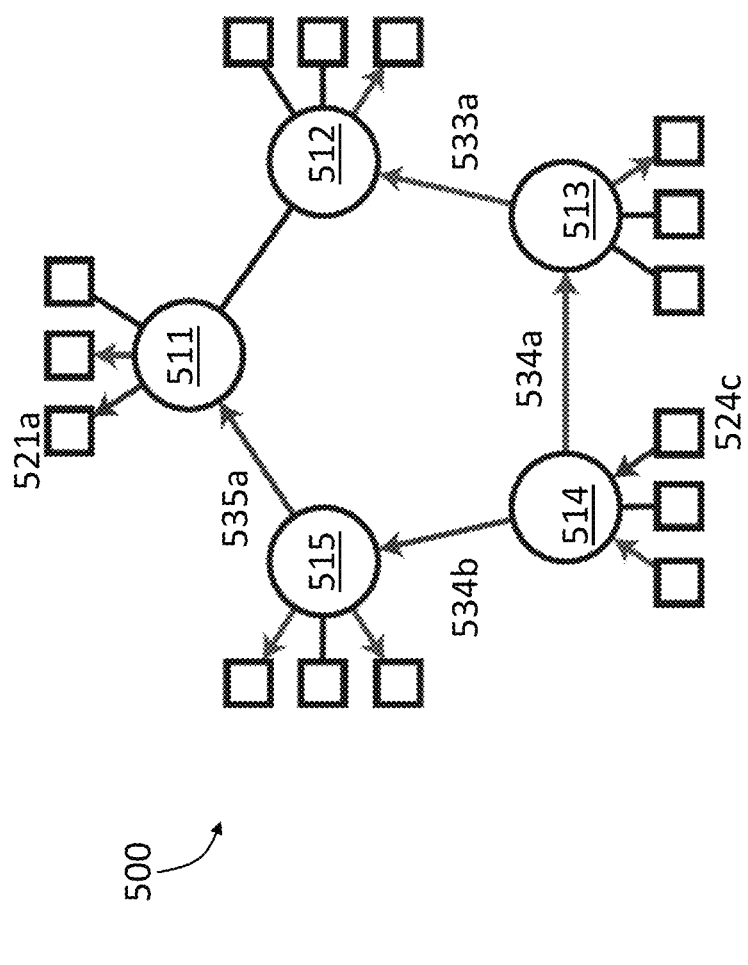

FIGS. 5A and 5B illustrate operation of a network 500 including routers 511 to 515 connected by electrical switches. Each router has three users: the first router 511 has users 521a to 521c, the second router 512 has users 522a to 522c, the third router 513 has users 523a to 523c, the fourth router 514 has users 524a to 524c, and the fifth router 515 has users 525a to 525c. FIG. 5B shows that the network 500 includes some connections that have a huge amount of data (also referred to as elephant flows), such as video streaming hosted by router 514 (traffic on 534a, 534b, and 533a) and large backup operations (e.g., traffic from 511 to 521a, and traffic from 524c and 514). These large transactions cause congestions in the network 500, thereby increasing latency and/or decreasing reliability for the rest of the users in the network 500.

To relieve the congestion on the network 500 due to these elephant flows, optical switches described herein can be included in the network 500 to hybridize the network 500. The hybridized network includes both optical switches and electrical switches to handle the traffic.

Figure 6A:
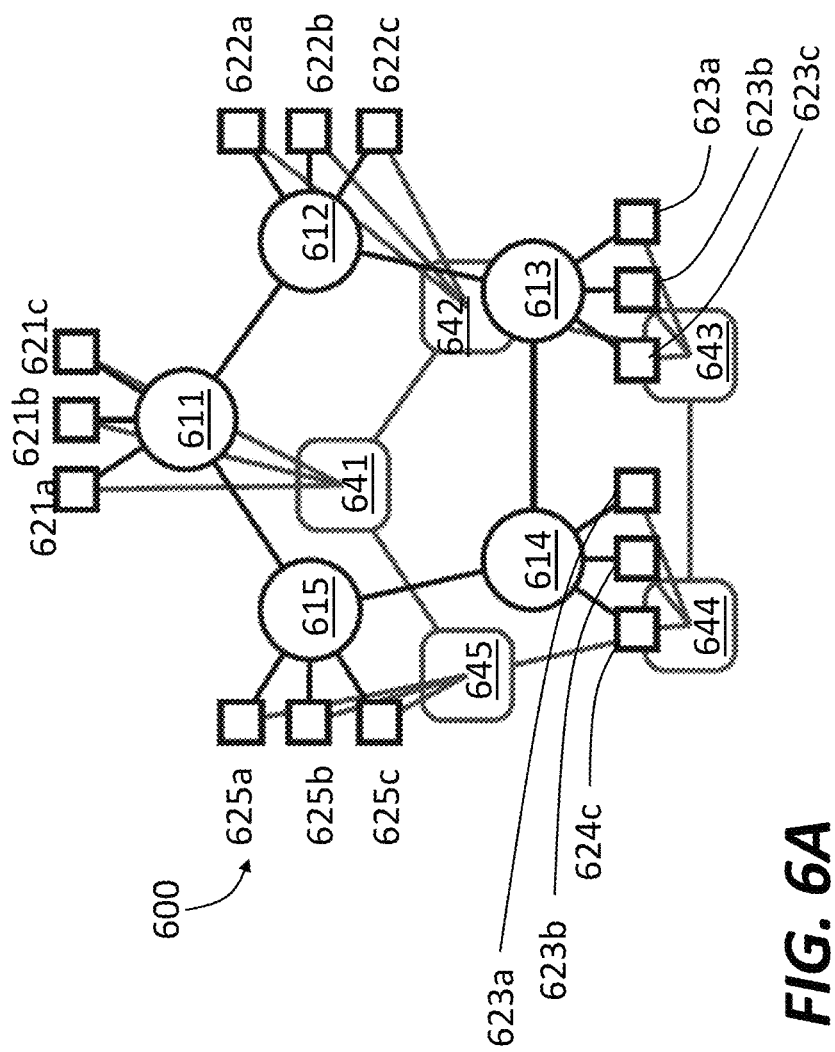
FIGS. 6A-6C illustrate operation of a hybrid network including both electrical switches and optical switches.
Figure 6B:
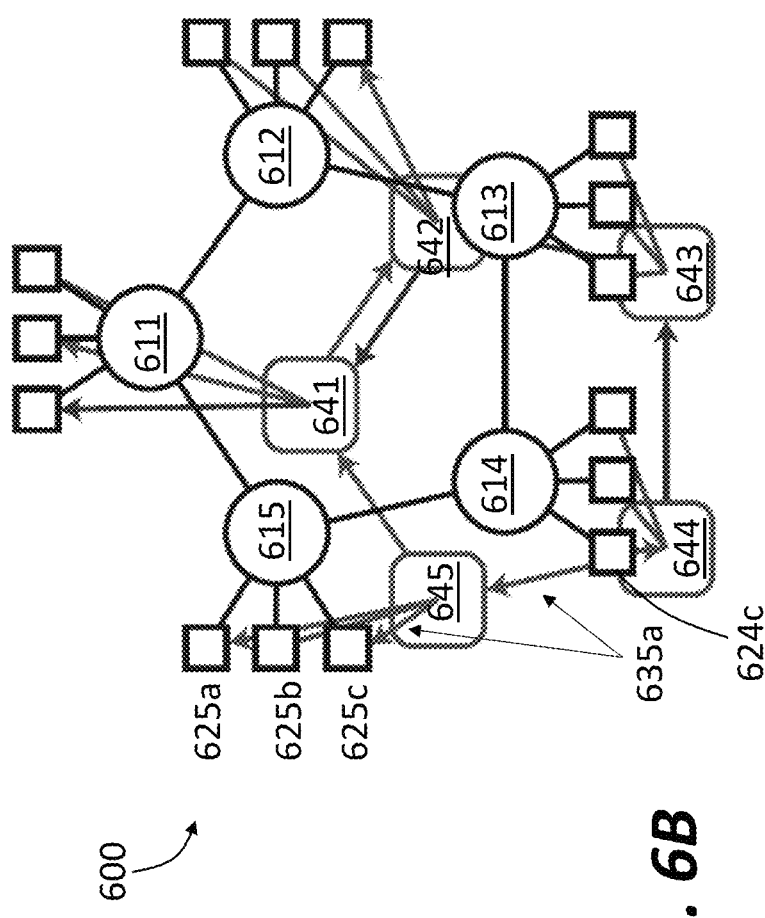
Figure 6C:
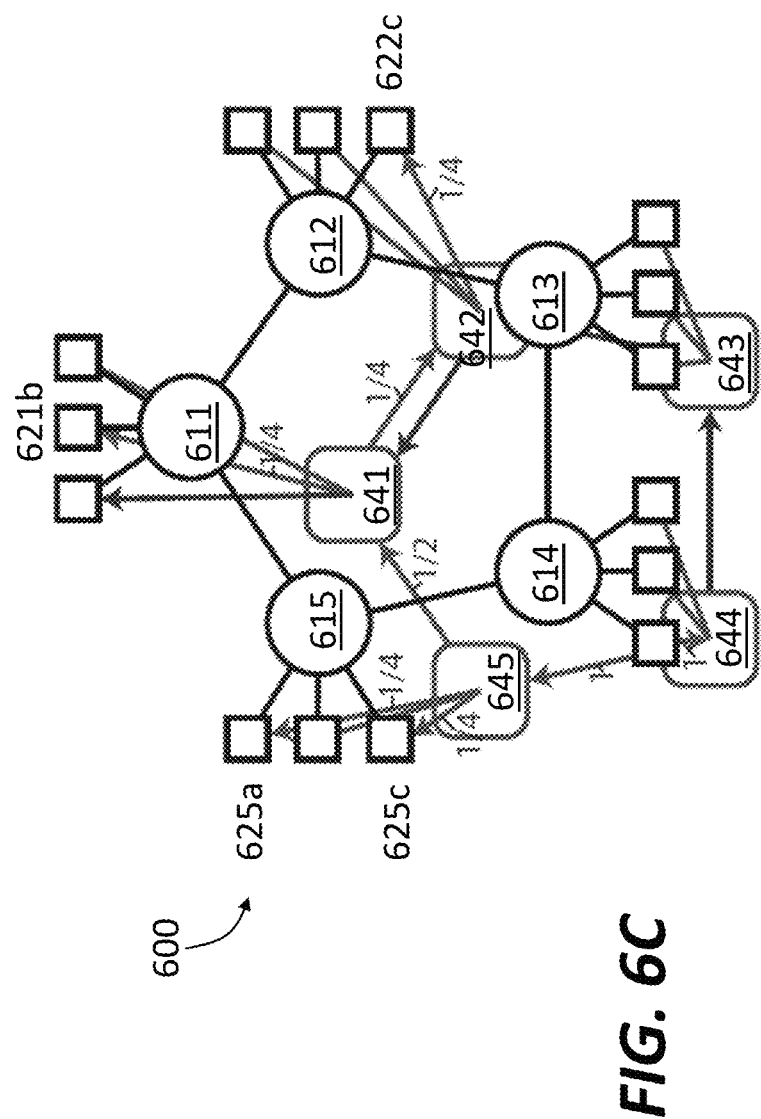

FIGS. 6A-6C illustrate operation of a network 600 including both electrical switches and optical switches. The network 600 includes 5 routers 611 to 615 connected by electrical switches. Each router has three users, i.e., the first router 611 has users 621a to 621c, the second router 612 has users 622a to 622c, the third router 613 has users 623a to 623c, the fourth router 614 has users 624a to 624c, and the fifth router 615 has users 625a to 625c. In addition to the electrical connections among routers 611 to 615, five optical switches 641 to 645 are also included in the network 600 to form a similar topology, i.e., the five optical switches 614 to 645 are connected by fibers to form a circle, and each optical switch is connected to three corresponding users also via fibers, as shown in FIG. 6A. These optical switches 641 to 645 (and the associated optical connections) form an optical layer that is separate from the conventional, electronic layer formed by the routers 611 to 615.

The optical switches 641 to 645 in the network 600 allow multicast switching of the elephant flow 635a to multiple destinations. As illustrated in FIG. 6B, the optical switch 645 receives data from user 624c and multicasts the data to three users 625a, 625b, and 625c using a single transmitter. In fact, so long as the data originates from the same source, the data can be pumped over the same optical channel, thereby relieving congestion due to multiple flows. In contrast, for electrical switches that are unicast, a separate transmitter is usually used for each destination of the elephant flow 635a.

The optical switches 641 to 645 also allow the balancing of power splitting to ensure that each user receives the same amount of power. As illustrated in FIG. 6C, the power of the data leaving the fourth optical switch 644 is arbitrarily set at 1. The fifth optical switch 645 receives the data from the fourth optical switch 644 and transmits ¼ of the power to each of the two local destinations 625a and 625c, leaving ½ of the power for the first optical switch 641. The first optical switch 641 then splits ¼ of the power that it receives to a third user 621b and sends the rest of the power to the second optical switch 642, which then directs the data to a fourth user 622c. In this manner, each of the four users 625a, 625c, 621b, and 622c in the network receives the same amount of power.

Figure 7:
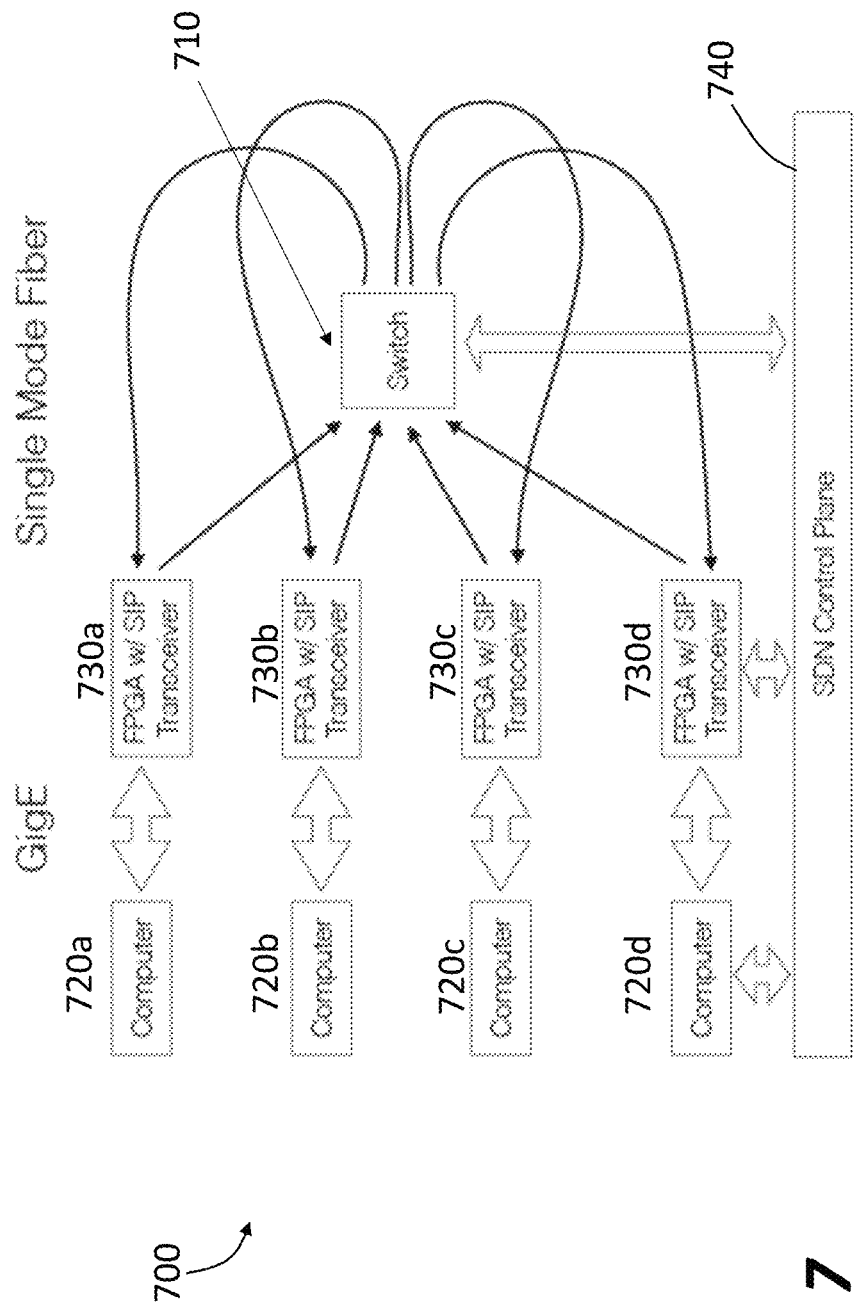
FIG. 7 shows a schematic of a network including four nodes optically connected via a nonblocking optical switch.

FIG. 7 shows a schematic of a network 700 including four nodes 720a, 720b, 720c, and 720d (collectively referred to as nodes 720) optically connected via a nonblocking optical switch 710. The switch 710 can be substantially identical to the switch 200 shown in FIGS. 2A-2C and can be fabricated on a semiconductor substrate to make it more compact. The nodes 720 can include, for example, computers, servers, routers, or any other appropriate devices. Each node 720a to 720d is coupled to a corresponding field-programmable gate array (FPGA) 730a to 730d via gigabit Ethernet (GigE). In addition, each node 720 includes an input interface to receive data (e.g., connected to output ports in the switch 710) and an output interface to transmit data (e.g., connected to input ports in the switch 710). The FPGAs 730 are employed as transmitters to establish a constant bit rate link over the switch 710 to ensure synchronicity. Ethernet packets are embedded into the data stream, which is received by the FPGA(s) 730 and transmitted via GigE to the receiving nodes 720. A software-defined networking (SDN) control plane 740 is used as a controller to control the operation of the network 700 (e.g., change the phase setting of phase shifters in the switch 710).

In the network 700, data from each node 720a to 720d can be multicast to any one or more of the other three nodes via the switch 710. In addition, existing paths (e.g., from first node 720a to second node 720b) can be reconfigured into new paths (e.g., from first node 720a to third node 720c) without disruption to the traffic (see descriptions above with reference to FIGS. 2A-2C). The network 700 is demonstrated to allow dynamic reconfiguration, showing that full-rate gigabit Ethernet is possible over multicast links. Sub-wavelength utilization of these links can also be achieved at the frame level by designating a frame as single-cast when the network 700 is configured for multi-cast. In sub-wavelength utilization, a server is sending data to multiple destinations. Instead of configuring a separate optical connection for each destination, the data for all users is multicast to all destinations, and the users select which frames are intended for their receipt.

Figure 8:
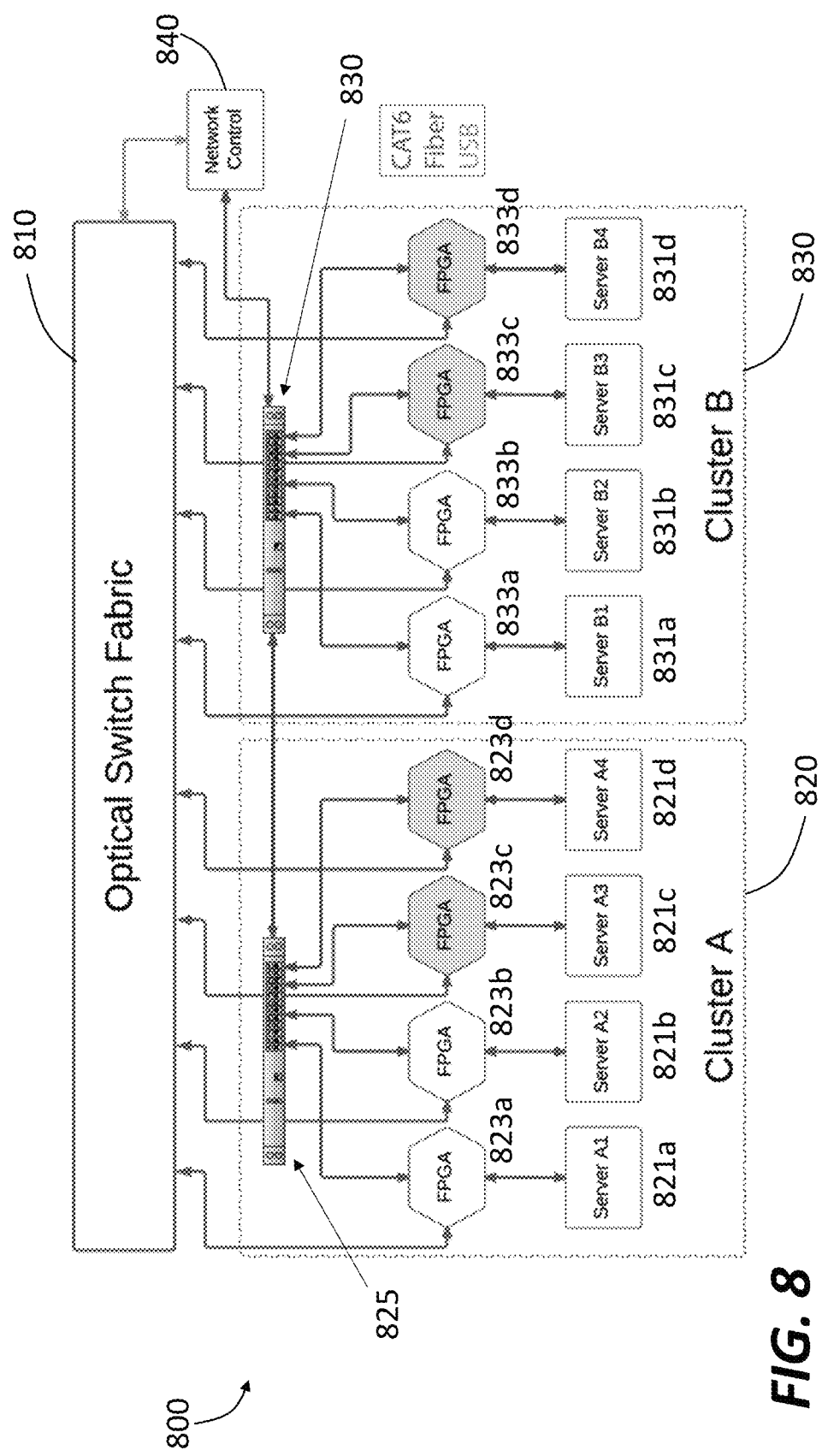
FIG. 8 shows a schematic of a network including two computer clusters connected by an optical switch fabric.

FIG. 8 shows a schematic of a network 800 including two computer clusters 820 and 830 connected by an optical switch fabric 810. The first cluster 820 includes four servers 821a to 821d, each of which is connected to the optical switch fabric 810 via a corresponding FPGA 823a to 823d. Similarly, the second cluster 830 includes four servers 831a to 831d, each of which is connected to the optical switch fabric 810 via a corresponding FPGA 833a to 833d. In addition, the first group of FPGAs 823a to 823d is connected to a controller 840 via a first rack switch 825 (usually an electrical switch), and the second group of FPGAs 833a to 833d is connected to the controller 840 via a second rack switch 835. The two rack switches 825 and 835 aggregate traffic between the clusters 820 and 830. The servers 821a to 821d and 831a to 831d communicate with the controller 840, which allocates optical paths on the switch 810. The FPGAs 823a to 823d and 833a to 833d sort packets by destination MAC address over the electrical or optical links. The FPGAs 823a to 823d and 833a to 833d also monitor network switch latency using a shared 200 MHz clock. The traffic can be user datagram protocol (UDP), meaning that congestion is manifested as packet loss. In this network 800, each server is able to communicate with any other servers.

Unlike previous MZI-based switch arrays, the switch 810 allows for any arbitrary linear optical transformation of dimension N. This enables high-fidelity unitary transformations even in the presence of fabrication errors resulting in excellent network switches with low cross-talk, reasonable insertion losses, and 100 μs switching times.

Characterizations of Nonblocking Optical Switches

Figure 9:
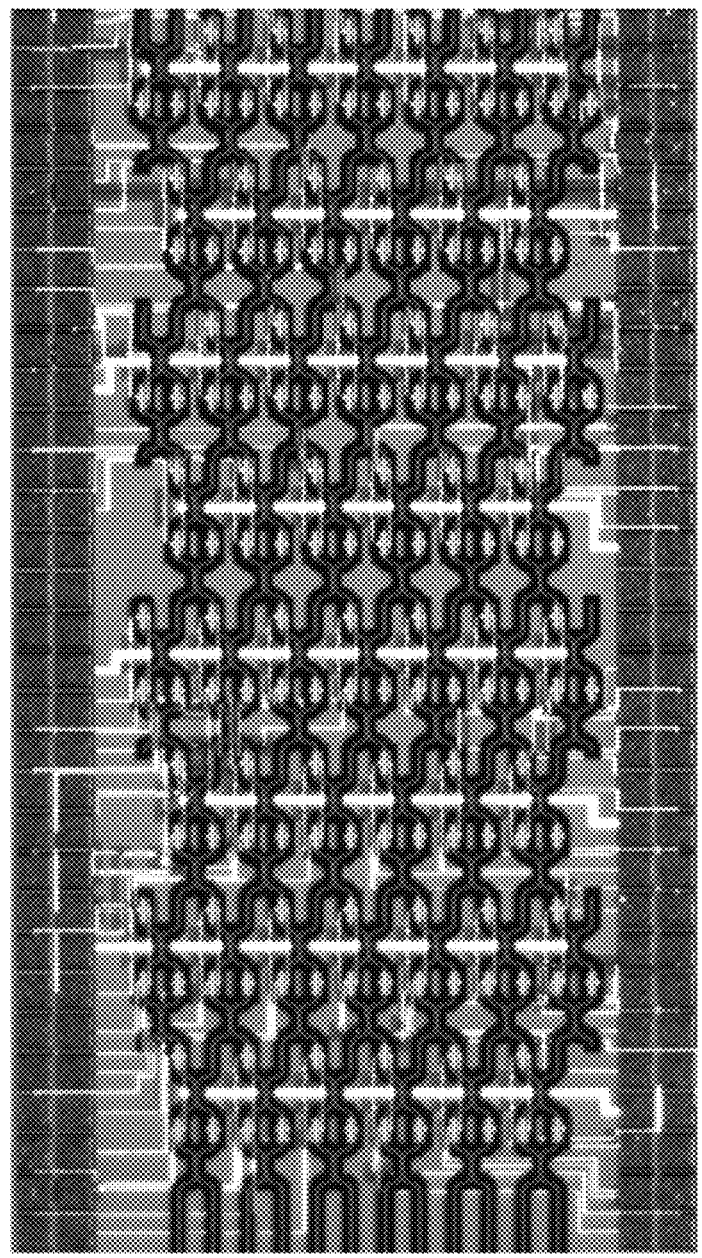
FIG. 9 shows a micrograph of a nonblocking optical switch that is substantially similar to the switch shown in FIGS. 2A-2C.

FIG. 9 shows a micrograph of a nonblocking optical switch that is substantially similar to the switch 200 shown in FIGS. 2A-2C. The switch was fabricated in a low-loss silicon-on-insulator process: each 2×2 unit cell has a 0.3 dB insertion loss on average. These losses are well matched throughout the system; each MZI has in excess of 30 dB of visibility. On-chip losses for the 8×8 system are less than 3 dB in total, though coupling losses may result in higher losses in test systems.

Packaging, calibrating, and controlling these systems has been a large engineering effort: each of the 104 active modulators on the chip uses a 0-10 V, 0-20 mA drive at high resolution, driven by a custom system of 16-bit DACs buffered by precision op-amps. The system is calibrated using a custom fast high dynamic range photodiode array, removing effects of fabrication variation. During this calibration process, a feed forward temperature stabilization is designed and built to prevent variation in coupling due to thermal expansion.

Although the system has relatively low speed reconfiguration (e.g., about 1 ms), the modulators intrinsically can have a bandwidth in excess of 100 kHz. In practice, 1 ms switching times are usually fast enough for a number of applications, such as optical flow switching (OF S), designed around the allocation of flows lasting about 0.1 to about 10 seconds. These flows allow for the efficient use of network resources by users that move a large amount of data at once, i.e. the network is switched once for the entire flow, rather than switching for each packet.

Figures 10A, 10B:
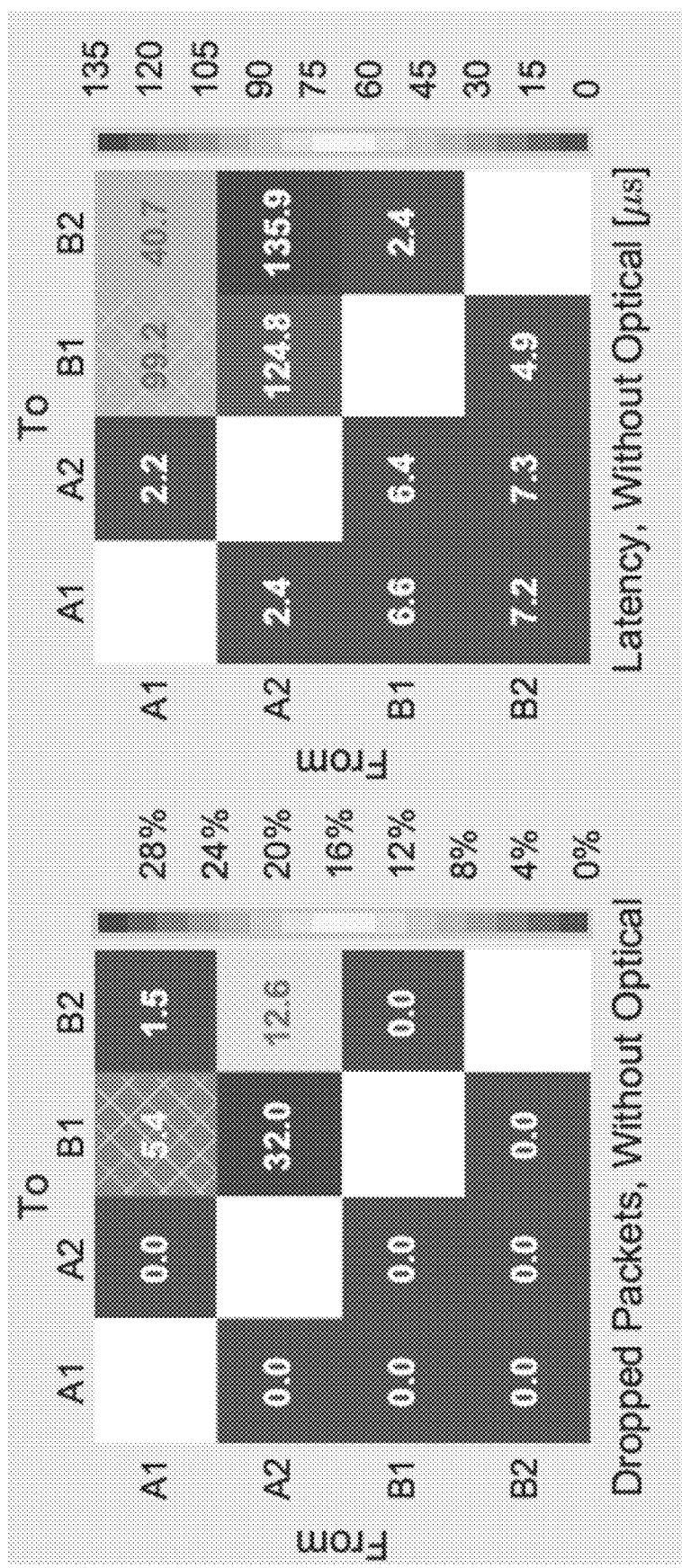
FIGS. 10A-10H show performance of the network illustrated in FIG. 8 with only Ethernet and with the optical layer enabled.
Figures 10C, 10D:
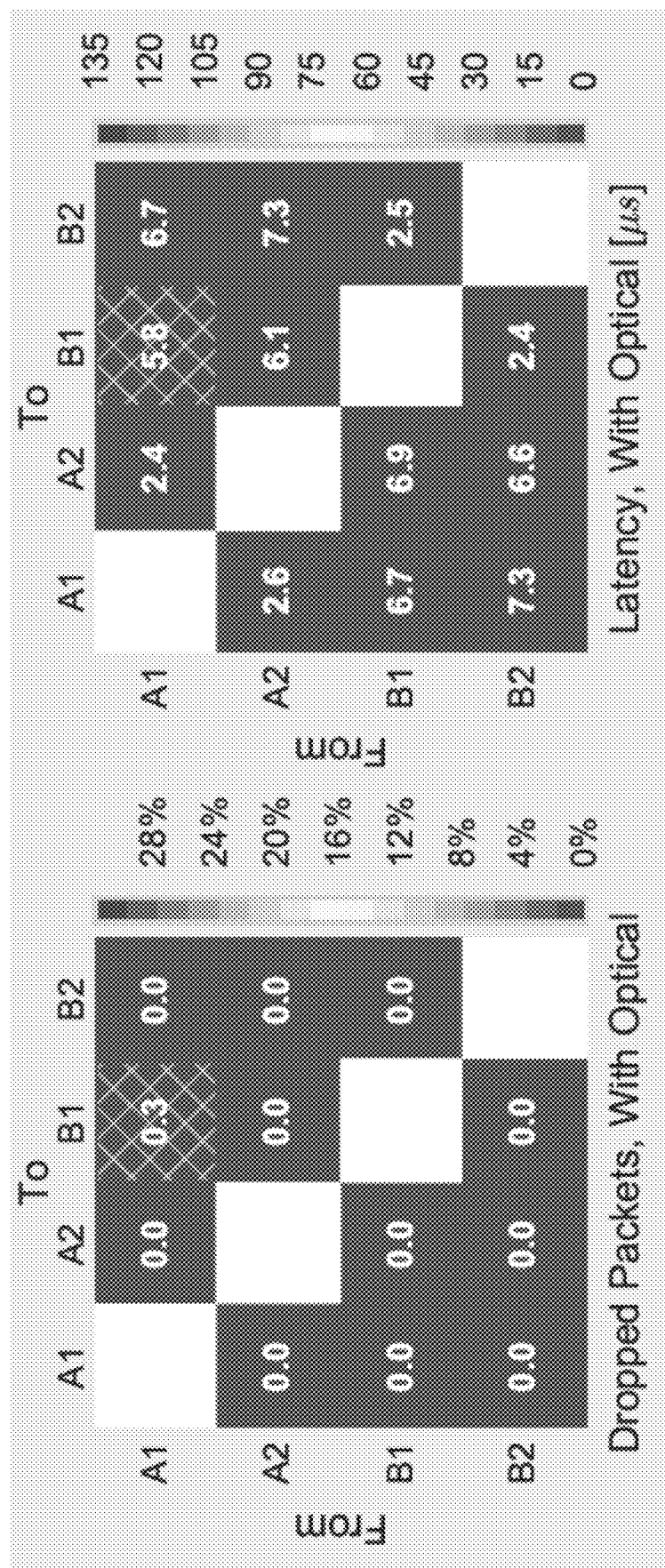
Figures 10E, 10F:
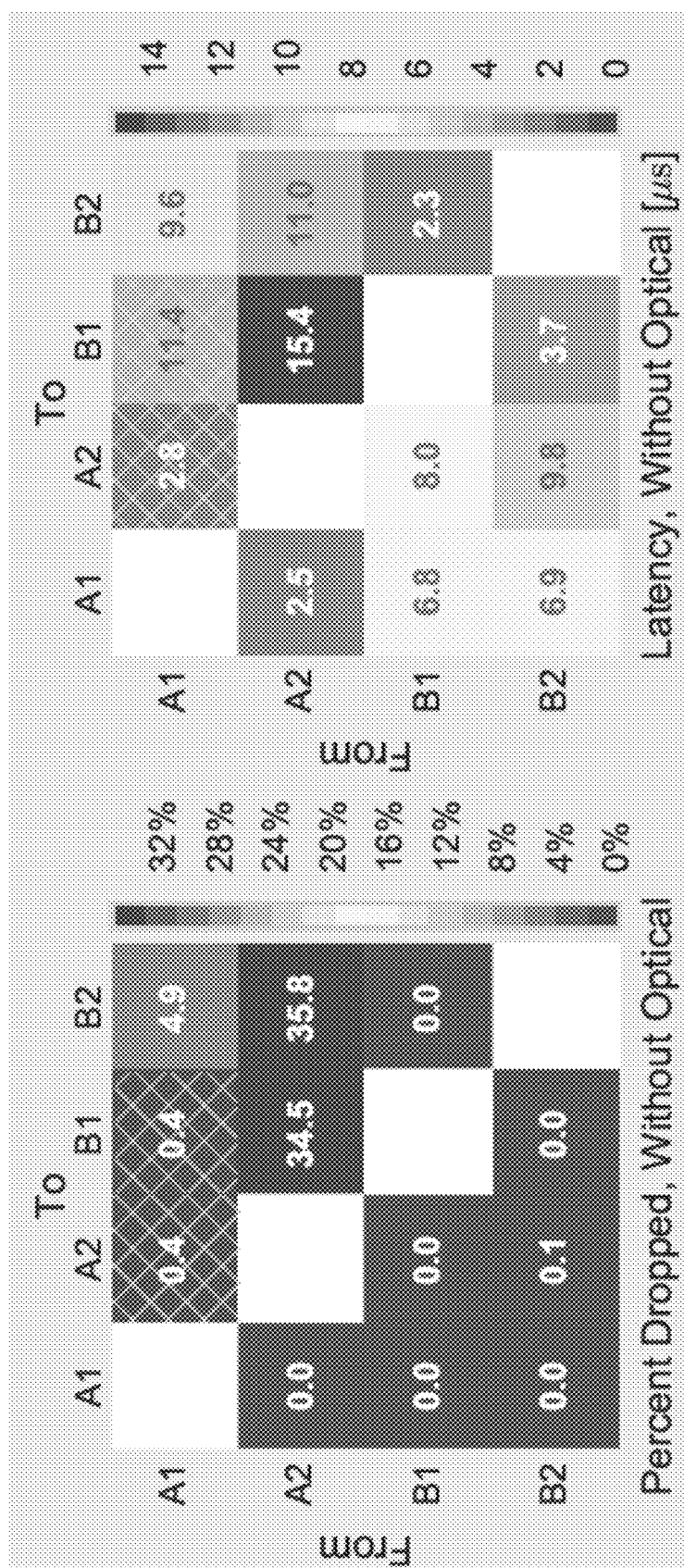
Figures 10G, 10H:
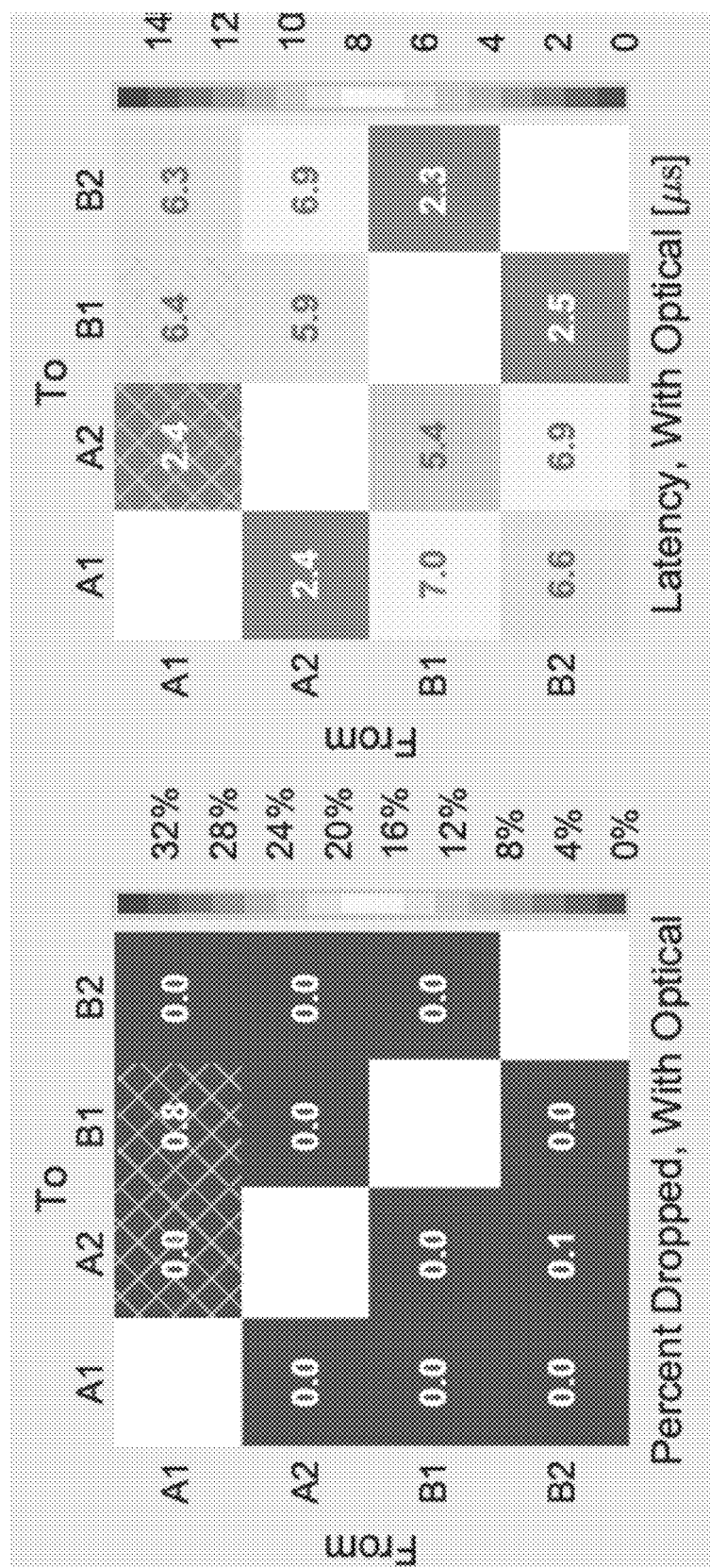

FIGS. 10A-10D show performance of the network 800 illustrated in FIG. 8 with only Ethernet and FIGS. 10E-10H show performance of the network 800 with the optical layer enabled. FIGS. 10A and 10B show the measured dropped packets and latency, respectively, of 600 Mbit flows from server A1 to server B1 with Ethernet connection only. FIGS. 10C and 10D show the measured dropped packets and latency, respectively, of 600 Mbit flows from server A1 to server B1 with both Ethernet connection and optical connection. FIGS. 10E and 10F show the measured dropped packets and latency, respectively, of 300 Mbit flows from server A1 to server B1 and from server A1 to server A2 with Ethernet connection only. FIGS. 10G and 10H show the measured dropped packets and latency, respectively, of 300 Mbit flows from server A1 to server B1 from server A1 to server A2 with both Ethernet connection and optical connection.

The latency and the throughput of the network 800 are compared under identical traffic conditions both with and without the optical layer enabled. When the optical layer was enabled, significant decreases in both latency and packet loss were observed. In both cases, there was all-to-all traffic of 25 megabits per second (Mbps) from each server to all others. In FIGS. 10A-10D, a single 600 Mbit flow is sent from Server A1 to Server B1. Introducing the optical layer drastically improves packet loss and latency. In FIGS. 10E-10H, 300 Mbit flows are sent from Server A1 to Server A2 and from Server A1 to Server B1, demonstrating the switch's ability to multicast traffic. The switch splits the light to both destinations and receiving FPGAs drop irrelevant packets. Performance from Cluster A to Cluster B is improved. Latency from Cluster B to Server A2 is also improved.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of nonblocking optical switching, the method comprising:
   guiding a first optical beam from a first input to a first output via a first path through an optical switching fabric, the first path traversing a phase shifter disposed between a pair of cascaded Mach-Zehnder interferometers;
   receiving a second optical beam for a second path through the optical switching fabric, the second path intersecting with the first path; and
   moving the first optical beam from the first path to a third path through the optical switching fabric, the third path connecting the first input to the first output without intersecting the second path; and
   shifting a phase of the first optical beam, with the phase shifter, while moving the first optical beam from the first path to the third path to prevent the first optical beam from interfering with the second optical beam.

2. The method of claim 1, wherein guiding the first optical beam from the first input to the first output via the first path comprises transmitting the first optical beam through at least eight Mach-Zehnder interferometers and at least seven phase shifters.

3. The method of claim 2, wherein moving the first optical beam from the first path to the third path occurs within one millisecond.

4. The method of claim 1, further comprising:
   splitting the second optical signal into a plurality of portions; and
   guiding each portion in the plurality of portions to a corresponding output of the optical switching fabric.

5. The method of claim 4, wherein splitting the second optical signal into the plurality of portions comprises splitting the second optical signal into a first portion having a first amplitude and a second portion having a second amplitude greater than the first amplitude.

6. The method of claim 1, wherein splitting the second optical signal comprises:

selecting, using a controller, a unitary matrix transformation having a predetermined power splitting; and adjusting a setting of the phase shifter so as to cause the switch to perform the unitary matrix transformation on the second optical beam.

7. The method of claim 1, further comprising:

identifying, using a controller, a first plurality of paths between the first input and the first output;

identifying, using the controller, a second plurality of paths in the first plurality of paths, the second plurality of paths not intersecting with the second path; and identifying the third path from the second plurality of paths based on a corresponding phase setting difference between each path in the second plurality of paths and the first path.

8. A reconfigurable, nonblocking optical switch comprising:

a substrate;

an optical switching fabric integrated on the substrate and configured to:

guide a first optical beam from a first input of the optical switching fabric to a first output of the optical switching fabric via a first path, the first path traversing a phase shifter disposed between a pair of cascaded Mach-Zehnder interferometers in the optical switching fabric;

receive a second optical beam for a second path through the optical switching fabric, the second path intersecting with the first path;

move the first optical beam from the first path to a third path through the optical switching fabric, the third path connecting the first input to the first output without intersecting the second path; and shift a phase of the first optical beam while moving the first optical beam from the first path to the third path to prevent the first optical beam from interfering with the second optical beam.

9. The reconfigurable, nonblocking optical switch of claim 8, wherein the first path traverses at least eight Mach-Zehnder interferometers and at least seven phase shifters.

10. The reconfigurable, nonblocking optical switch of claim 9, further comprising a controller configured to move the first optical beam from the first path to the third path within one millisecond.

11. The reconfigurable, nonblocking optical switch of claim 8, wherein the optical switching fabric is configured to split the second optical signal into a plurality of portions and to guide each portion in the plurality of portions to a corresponding output of the optical switching fabric.

12. The reconfigurable, nonblocking optical switch of claim 8, wherein the optical switching fabric is configured to split the second optical signal into a first portion having a first amplitude and a second portion having a second amplitude greater than the first amplitude.

13. The reconfigurable, nonblocking optical switch of claim 8, further comprising a controller configured to:

select a unitary matrix transformation having a predetermined power splitting; and adjust a setting of the phase shifter so as to cause the switch to perform the unitary matrix transformation on the second optical beam.

14. The reconfigurable, nonblocking optical switch of claim 8, further comprising a controller configured to:

identify a first plurality of paths between the first input and the first output;

identify a second plurality of paths in the first plurality of paths, the second plurality of paths not intersecting with the second path; and identify the third path from the second plurality of paths based on a corresponding phase setting difference between each path in the second plurality of paths and the first path.

* * * * *